US012626199B2

(12) United States Patent
Sawada et al.

(10) Patent No.: US 12,626,199 B2
(45) Date of Patent: May 12, 2026

(54) GATEWAY DEVICE, COMPUTER PROGRAM PRODUCT, AND GATEWAY SYSTEM

(71) Applicant: KABUSHIKI KAISHA TOSHIBA, Tokyo (JP)

(72) Inventors: Asuka Sawada, Tokyo (JP); Tomonori Maegawa, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 516 days.

(21) Appl. No.: 17/823,158

(22) Filed: Aug. 30, 2022

(65) Prior Publication Data

US 2023/0196220 A1    Jun. 22, 2023

(30) Foreign Application Priority Data

Dec. 16, 2021    (JP) ................................. 2021-204405

(51) Int. Cl.
*H02J 13/00* (2026.01)
*G06F 13/00* (2006.01)
*G06Q 10/0631* (2023.01)

(52) U.S. Cl.
CPC ......... *G06Q 10/0631* (2013.01); *G06F 13/00* (2013.01); *H02J 13/00* (2013.01)

(58) Field of Classification Search
None
See application file for complete search history.

(56) References Cited

U.S. PATENT DOCUMENTS

2004/0103232 A1* 5/2004 Clayton ................ H04L 49/254
710/244
2005/0187727 A1* 8/2005 Weik ................. H02J 13/00002
700/291

2014/0330442 A1    11/2014 Obara et al.
2018/0254635 A1*    9/2018 Yoo ........................ G06Q 30/02
2019/0217737 A1*    7/2019 Lotfy ..................... G06Q 10/02
2021/0050726 A1    2/2021 Kitaji

FOREIGN PATENT DOCUMENTS

| | | |
|---|---|---|
| JP | 2016-192872 A | 11/2016 |
| JP | 2019-33566 A | 2/2019 |
| JP | 2019-46155 A | 3/2019 |
| JP | 2019-152895 A | 9/2019 |
| JP | 6838009 B2 | 3/2021 |
| WO | WO 2013/069717 A1 | 5/2013 |
| WO | WO 2019/150814 A1 | 8/2019 |

OTHER PUBLICATIONS

Japan Patent Office, Office Action in JP App. No. 2021-204405,2 pages, and machine translation, 3 pages (Dec. 24, 2024).

* cited by examiner

*Primary Examiner* — Paul B Yanchus, III

(74) *Attorney, Agent, or Firm* — Finnegan, Henderson, Farabow, Garrett & Dunner, LLP

(57) ABSTRACT

A gateway device according to one embodiment includes one or more hardware processors functioning as a data communication unit, a command synthesis unit, and a command unit. The data communication unit serves to receive, from service business operators, pieces of command information each including a desired output value. The command synthesis unit serves to synthesize the pieces of command information and generate synthesis command information indicating instructed output values for each time slot. The command unit serves to transmit the synthesis command information to an energy resource.

17 Claims, 16 Drawing Sheets

1

GATEWAY DEVICE

STORAGE UNIT
CONTRACT INFORMATION DB — 14A
RESOURCE INFORMATION DB — 14B
DISTRIBUTION RATIO DB — 14C

CONTROL UNIT (30A, 30B, 30C, 30D···) 30
SERVICE BUSINESS OPERATOR TERMINAL

DATA COMMUNICATION UNIT 12A

COMMAND SYNTHESIS UNIT 12B
COMMAND UNIT 12C

ACTUAL VALUE APPORTIONMENT UNIT 12E
ACTUAL VALUE COLLECTION UNIT 12D (20A, 20B, 20C···) 20
ENERGY RESOURCE

| COMMAND INFORMATION | | |
|---|---|---|
| SERVICE BUSINESS OPERATOR ID | DESIRED OUTPUT VALUE | DESIRED PROVISION TIME SLOT |
| Z-000001 | 100 KW | 2021-10-27T8:00:00/2021-10-27T9:30:00 |
| Z-000001 | 50 KW | 2021-10-27T11:00:00/2021-10-27T13:00:00 |
| Z-000002 | 60 KW | 2021-10-27T10:00:00/2021-10-27T12:00:00 |
| Z-001001 | 2100 KW | 2021-10-27T14:00:00/2021-10-27T16:00:00 |
| Z-001002 | 1050 KW | 2021-10-27T15:30:00/2021-10-27T17:00:00 |
| ... | ... | ... |

FIG.3

CONTRACT INFORMATION DB    ⌐14A

| CONTRACT INFORMATION | | | | |
|---|---|---|---|---|
| SERVICE BUSINESS OPERATOR ID | RESOURCE OWNER ID | PRIORITY INFORMATION | | |
| | | CONTRACT TYPE | COMMAND PRIORITY | DISTRIBUTION POLICY |
| Z-000001 | A-000004 | BRONZE | 4 | COMMAND-PRIORITY PRIORITIZATION |
| Z-000002 | A-000004 | GOLD | 2 | COMMAND-PRIORITY PRIORITIZATION |
| Z-000003 | A-000002 | BRONZE | 4 | PRIOR-RECEPTION PRIORITIZATION |
| Z-001001 | A-000001 | SILVER | 3 | PRIOR-RECEPTION PRIORITIZATION |
| Z-001002 | A-000004 | DIAMOND | 1 | COMMAND-PRIORITY PRIORITIZATION |
| ... | ... | ... | ... | ... |

FIG.4

RESOURCE INFORMATION DB                                           ⌐14B

| RESOURCE OWNER ID | RESOURCE ID | RESOURCE INFORMATION | | |
|---|---|---|---|---|
| | | RESOURCE TYPE | MINIMUM OUTPUT | MAXIMUM OUTPUT |
| A-000001 | R-000101 | STORAGE BATTERY | -200 KW | 250 KW |
| A-000001 | R-000326 | SOLAR PANEL | 0 KW | 500 KW |
| A-000002 | R-000055 | EV | -3 KW | 5 KW |
| A-000003 | R-001002 | SOLAR PANEL | 0 KW | 4 KW |
| A-000003 | R-001014 | ILLUMINATION | -0.5 KW | 0 KW |
| A-000003 | R-002005 | AIR CONDITIONER | -3.5 KW | 0 KW |
| A-000004 | R-000078 | STORAGE BATTERY | -80 KW | 100 KW |
| ... | ... | ... | ... | ... |

FIG.7

DISTRIBUTION RATIO DB

14C

| SERVICE BUSINESS OPERATOR ID | RESOURCE ID | DESIRED OUTPUT VALUE | SCHEDULED PROVISION DISTRIBUTION RATIO | DESIRED PROVISION TIME SLOT |
|---|---|---|---|---|
| Z-000001 | R-000203 | 100 KW | 1 | 2021-10-27T8:00:00/2021-10-27T9:30:00 |
| Z-000001 | R-000078 | 50 KW | 0.4 | 2021-10-27T11:00:00/2021-10-27T12:00:00 |
| Z-000001 | R-000078 | 50 KW | 1 | 2021-10-27T12:00:00/2021-10-27T13:00:00 |
| Z-000002 | R-000078 | 60 KW | 1 | 2021-10-27T10:00:00/2021-10-27T11:00:00 |
| Z-000002 | R-000078 | 60 KW | 0.6 | 2021-10-27T11:00:00/2021-10-27T12:00:00 |
| Z-001001 | R-001002 | 2100 KW | 0.2 | 2021-10-27T14:00:00/2021-10-27T16:00:00 |
| Z-001002 | R-001014 | 1050 KW | 0.9 | 2021-10-27T15:30:00/2021-10-27T17:00:00 |
| ⋮ | ⋮ | ⋮ | ⋮ | ⋮ |

FIG.8

| SYNTHESIS COMMAND INFORMATION | | |
|---|---|---|
| RESOURCE ID | INSTRUCTED OUTPUT VALUE | TIME SLOT |
| R-000011 | 100 KW | 2021-10-27T8:00:00/2021-10-27T9:30:00 |
| R-000078 | 60 KW | 2021-10-27T10:00:00/2021-10-27T11:00:00 |
| R-000078 | 100 KW | 2021-10-27T11:00:00/2021-10-27T12:00:00 |
| R-000078 | 50 KW | 2021-10-27T12:00:00/2021-10-27T13:00:00 |
| R-001002 | 200 KW | 2021-10-27T14:00:00/2021-10-27T16:00:00 |
| R-001014 | 1050 KW | 2021-10-27T15:30:00/2021-10-27T17:00:00 |
| ... | ... | ... |

FIG.9

SCHEDULED PROVISION OUTPUT INFORMATION

| RESOURCE ID | RESOURCE OWNER ID | SCHEDULED PROVISION OUTPUT VALUE | SCHEDULED PROVISION TIME SLOT |
|---|---|---|---|
| R-001205 | A-000104 | 50 KW | 2021-10-27T8:00:00/2021-10-27T10:00:00 |
| R-000369 | A-000075 | 100 KW | 2021-10-27T10:00:00/2021-10-27T11:30:00 |
| R-001205 | A-000104 | 30 KW | 2021-10-27T10:00:00/2021-10-27T11:30:00 |
| R-000021 | A-000104 | 200 KW | 2021-10-27T11:30:00/2021-10-27T13:00:00 |
| R-000369 | A-000075 | 150 KW | 2021-10-27T13:00:00/2021-10-27T15:00:00 |
| ... | ... | ... | ... |

FIG.10

| ACTUAL OUTPUT INFORMATION | | |
|---|---|---|
| RESOURCE ID | ACTUAL OUTPUT VALUE | ACTUAL VALUE COLLECTION TIME |
| R-000078 | 102 KW | 2021-10-27T11:32:30 |
| R-000539 | 199 KW | 2021-10-27T11:32:30 |
| R-001026 | 593 KW | 2021-10-27T11:32:30 |
| R-000021 | 201 KW | 2021-10-27T11:32:30 |
| ... | ... | ... |

FIG.11

| SERVICE BUSINESS OPERATOR ID | ACTUAL DISTRIBUTION INFORMATION | | |
|---|---|---|---|
| | RESOURCE ID | ACTUAL DISTRIBUTED OUTPUT VALUE | ACTUAL VALUE COLLECTION TIME |
| Z-000001 | R-000078 | 41 KW | 2021-10-27T11:32:30 |
| | R-000539 | 11 KW | 2021-10-27T11:32:30 |
| ... | ... | ... | ... |

FIG.14A

| COMMAND INFORMATION | | | |
|---|---|---|---|
| SERVICE BUSINESS OPERATOR ID | DESIRED OUTPUT VALUE | COMMAND PRIORITY | DESIRED PROVISION TIME SLOT |
| Z-1 | 60 KW | HIGH | 2021-10-27T10:00:00/2021-10-27T11:00:00 |
| Z-1 | 60 KW | HIGH | 2021-10-27T11:00:00/2021-10-27T12:00:00 |
| Z-1 | 60 KW | HIGH | 2021-10-27T12:00:00/2021-10-27T13:00:00 |
| Z-2 | 50 KW | LOW | 2021-10-27T10:00:00/2021-10-27T11:00:00 |
| Z-2 | 50 KW | LOW | 2021-10-27T11:00:00/2021-10-27T12:00:00 |
| Z-2 | 50 KW | LOW | 2021-10-27T12:00:00/2021-10-27T13:00:00 |

FIG.14B

| SYNTHESIS COMMAND INFORMATION | | |
|---|---|---|
| RESOURCE ID | INSTRUCTED OUTPUT VALUE | TIME SLOT |
| R-1 | 30 KW | 2021-10-27T10:00:00/2021-10-27T11:00:00 |
| R-1 | 30 KW | 2021-10-27T11:00:00/2021-10-27T12:00:00 |
| R-1 | 0 KW | 2021-10-27T12:00:00/2021-10-27T13:00:00 |
| R-2 | 30 KW | 2021-10-27T10:00:00/2021-10-27T11:00:00 |
| R-2 | 40 KW | 2021-10-27T11:00:00/2021-10-27T12:00:00 |
| R-2 | 30KW | 2021-10-27T12:00:00/2021-10-27T13:00:00 |
| R-3 | 0 KW | 2021-10-27T10:00:00/2021-10-27T11:00:00 |
| R-3 | 20 KW | 2021-10-27T11:00:00/2021-10-27T12:00:00 |
| R-3 | 20 KW | 2021-10-27T12:00:00/2021-10-27T13:00:00 |

DISTRIBUTION RATIO DB

15C

| SERVICE BUSINESS OPERATOR ID | URI OF INDIVIDUAL DATA COMMUNICATION UNIT | RESOURCE ID | DESIRED OUTPUT VALUE | SCHEDULED PROVISION DISTRIBUTION RATIO | DESIRED PROVISION TIME SLOT |
|---|---|---|---|---|---|
| Z-000001 | https://api-2..... | R-000203 | 100 KW | 1 | 2021-10-27T8:00:00/2021-10-27T9:30:00 |
| Z-000001 | https://api-2..... | R-000078 | 50 KW | 0.4 | 2021-10-27T11:00:00/2021-10-27T12:00:00 |
| Z-000001 | https://api-2..... | R-000078 | 50 KW | 1 | 2021-10-27T12:00:00/2021-10-27T13:00:00 |
| Z-000002 | https://api-1..... | R-000078 | 60 KW | 1 | 2021-10-27T10:00:00/2021-10-27T11:00:00 |
| Z-000002 | https://api-1..... | R-000078 | 60 KW | 0.6 | 2021-10-27T11:00:00/2021-10-27T12:00:00 |
| Z-001001 | https://api-2..... | R-001002 | 2100 KW | 0.2 | 2021-10-27T14:00:00/2021-10-27T16:00:00 |
| Z-001002 | https://api-1..... | R-001014 | 1050 KW | 0.9 | 2021-10-27T15:30:00/2021-10-27T17:00:00 |
| ... | ... | ... | ... | ... | ... |

FIG.18

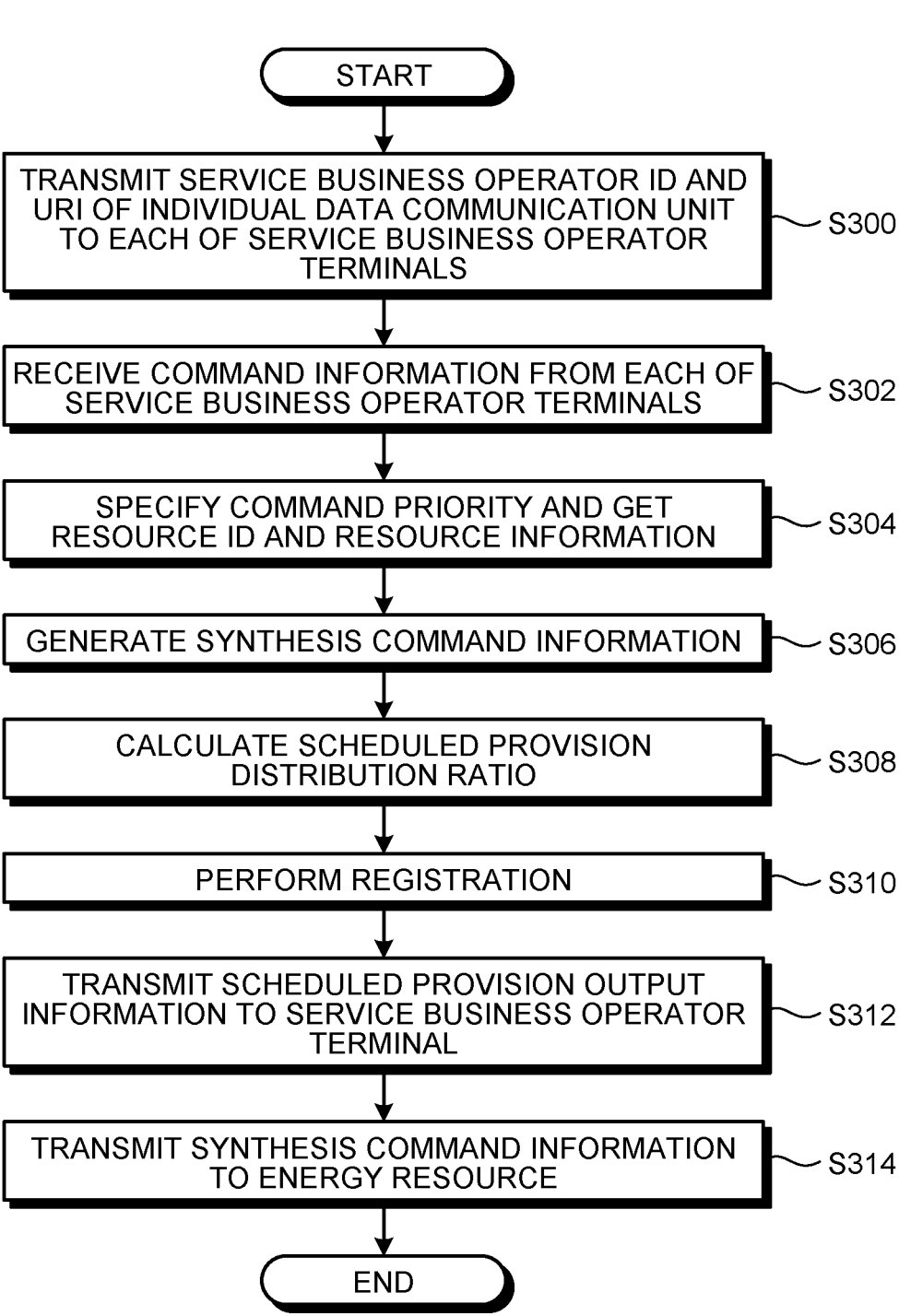

START

TRANSMIT SERVICE BUSINESS OPERATOR ID AND URI OF INDIVIDUAL DATA COMMUNICATION UNIT TO EACH OF SERVICE BUSINESS OPERATOR TERMINALS — S300

RECEIVE COMMAND INFORMATION FROM EACH OF SERVICE BUSINESS OPERATOR TERMINALS — S302

SPECIFY COMMAND PRIORITY AND GET RESOURCE ID AND RESOURCE INFORMATION — S304

GENERATE SYNTHESIS COMMAND INFORMATION — S306

CALCULATE SCHEDULED PROVISION DISTRIBUTION RATIO — S308

PERFORM REGISTRATION — S310

TRANSMIT SCHEDULED PROVISION OUTPUT INFORMATION TO SERVICE BUSINESS OPERATOR TERMINAL — S312

TRANSMIT SYNTHESIS COMMAND INFORMATION TO ENERGY RESOURCE — S314

END

START

COLLECT ACTUAL OUTPUT VALUES FROM ENERGY RESOURCES ⟋ S400

DETERMINE ACTUAL DISTRIBUTION INFORMATION FOR SERVICE BUSINESS OPERATORS ⟋ S402

TRANSMIT ACTUAL DISTRIBUTION INFORMATION TO SERVICE BUSINESS OPERATOR TERMINALS ⟋ S404

END

<u>10, 11</u>

I/F UNIT ⟋ 90A

⟋ 90F

CPU ⟋ 90B

ROM ⟋ 90C

RAM ⟋ 90D

HDD ⟋ 90E

GATEWAY DEVICE, COMPUTER PROGRAM PRODUCT, AND GATEWAY SYSTEM

CROSS-REFERENCE TO RELATED APPLICATIONS

This application is based upon and claims the benefit of priority from Japanese Patent Application No. 2021-204405, filed on Dec. 16, 2021; the entire contents of which are incorporated herein by reference.

FIELD

Embodiments described herein relate generally to a gateway device, a computer program product, and a gateway system.

BACKGROUND

In a recently established configuration of energy management toward carbon neutral realization, dispersive energy resources are collectively and integrally controlled by a service business operator, which is referred to as an aggregator, and are utilized for supply-demand balance adjustment of electric power. The configuration of the integrated control is also referred to as virtual power plant (VPP), demand response (DR), and the like. Specifically, the configuration of the integrated control is such that a command for an output necessary at a time point is transmitted from the service business operator toward each energy resource and the energy resource provides an output in accordance with the command, thereby performing overall supply-demand adjustment. However, in a state in which resources of one energy resource are shared among service business operators and can be controlled by those service business operators, there is a possibility that conflict occurs among commands received from the service business operator by the energy resources.

Conventionally, a system having functions for setting and managing access permission information indicating which service business operator can control which energy resource has been disclosed. In addition, a system having functions of providing priorities to multiple commands from service business operators and transferring commands having higher priorities first to an energy resource has been disclosed.

However, in the conventional technologies, the number of commands that can be received by an energy resource is limited to one for each time slot. Thus, when capacity is available in an output that can be provided by the energy resource in accordance with one command received from one service business operator, the output of the available capacity cannot be provided to any other service business operator. Accordingly, with the conventional technologies, the output that can be provided by the energy resource cannot be utilized to maximum. In other words, with the conventional technologies, it has been difficult that the energy resource can provide an output to a larger number of service business operators in any time slot.

BRIEF DESCRIPTION OF THE DRAWINGS

FIG. 2 is a schematic diagram of a data configuration of command information;
FIG. 3 is a schematic diagram of a data configuration of a contract information DB;

2

Figure 5A:
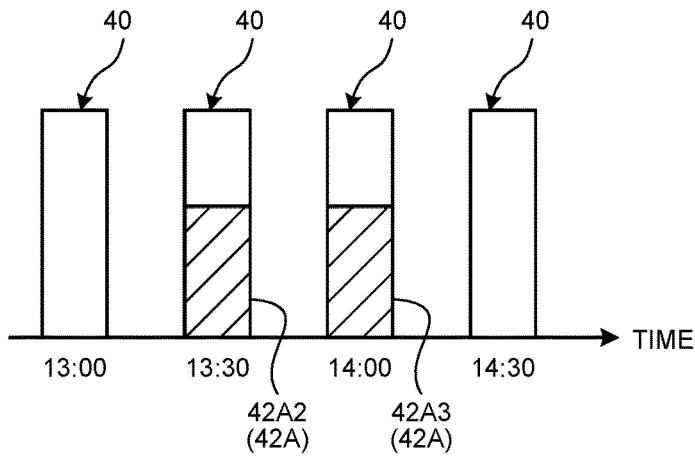
Figure 5B:
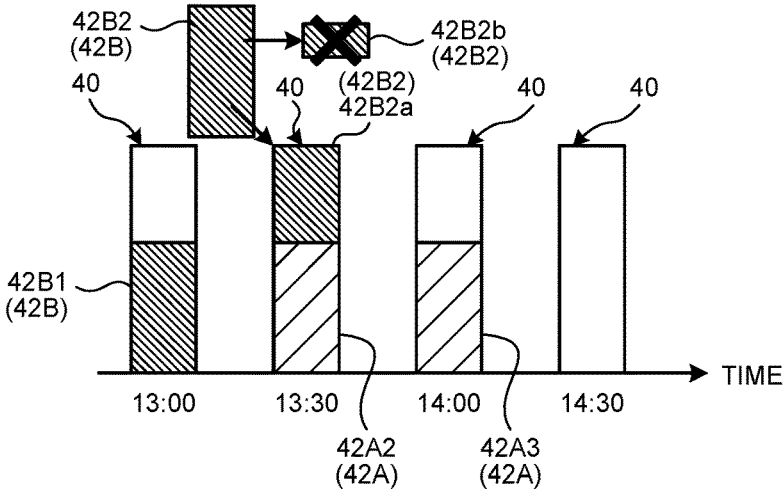
Figure 5C:
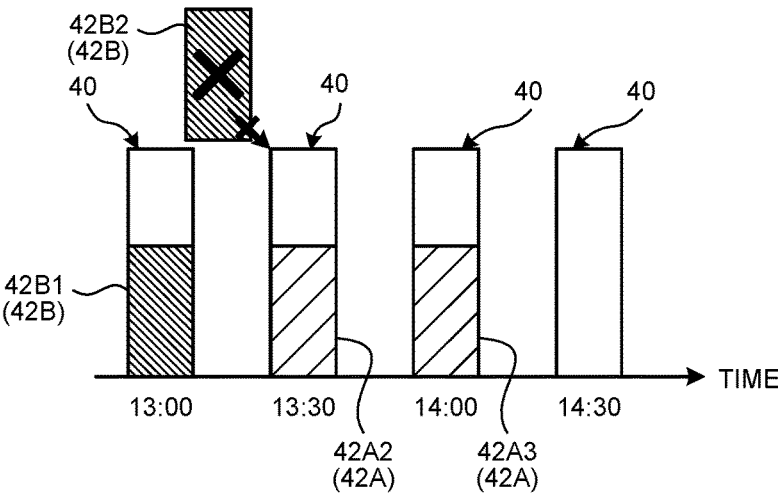
Figure 6A:
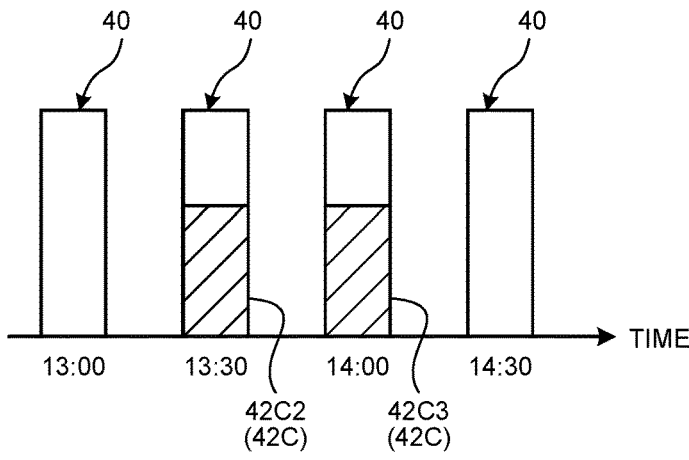
Figure 6B:
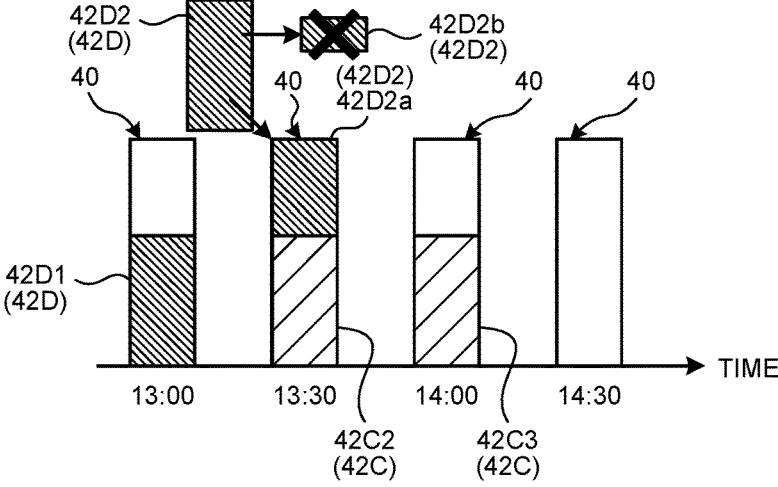
Figure 6C:
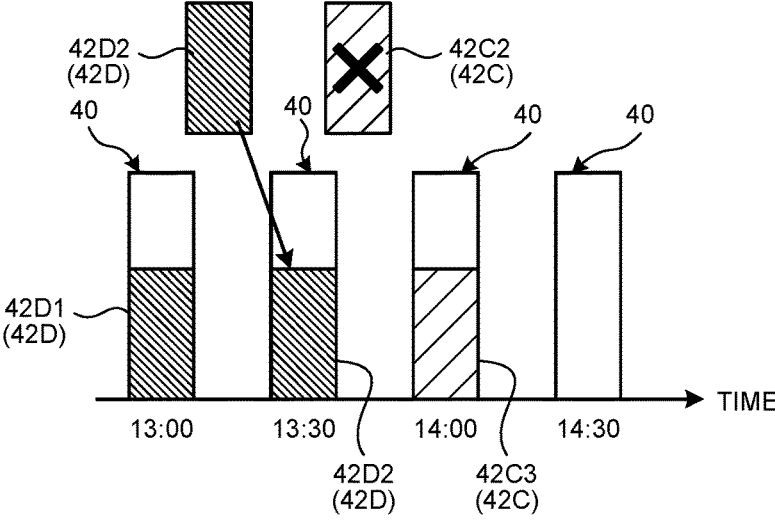
Figure 12A:
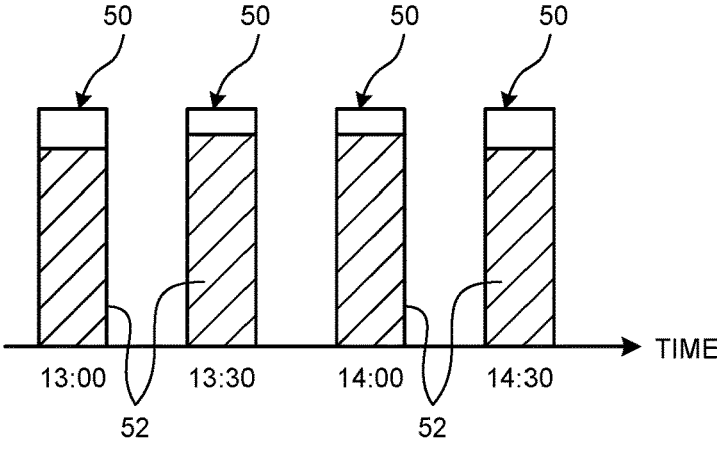
Figure 12B:
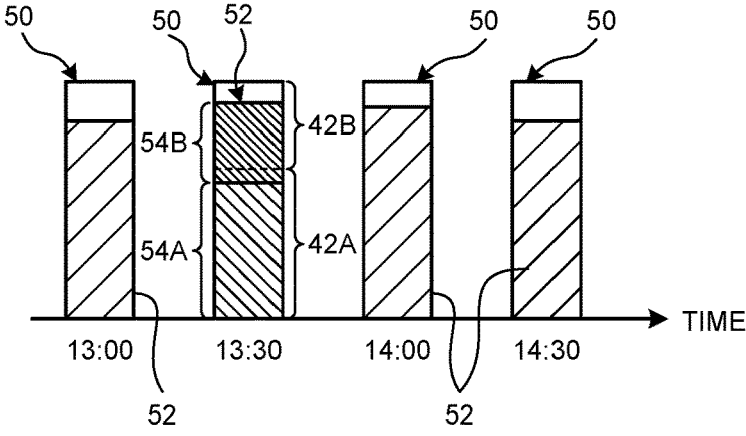
Figure 12C:
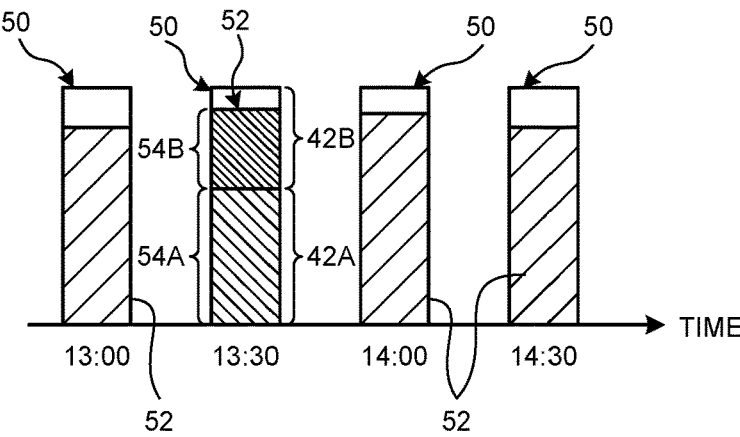
Figure 13:
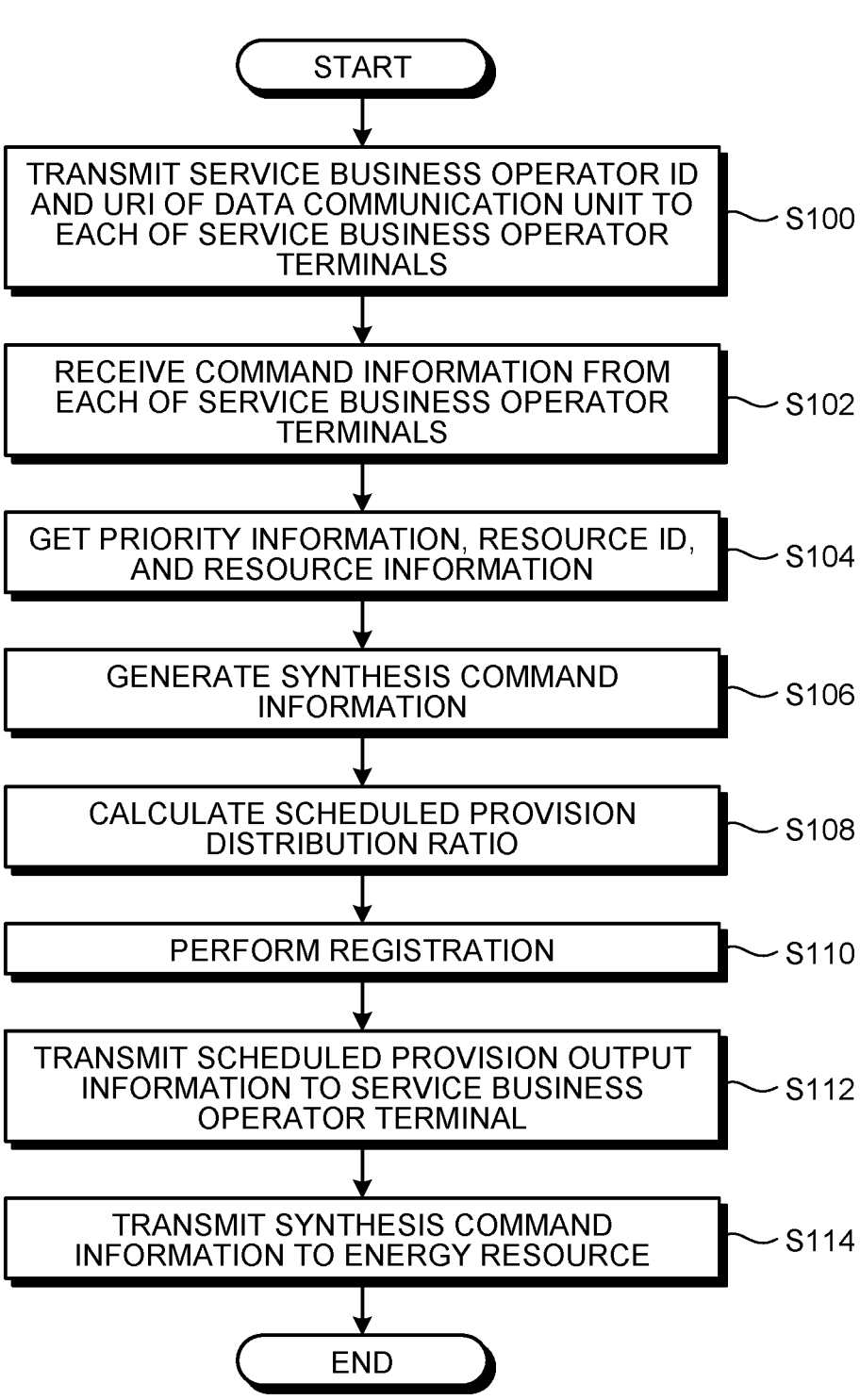
Figure 15:
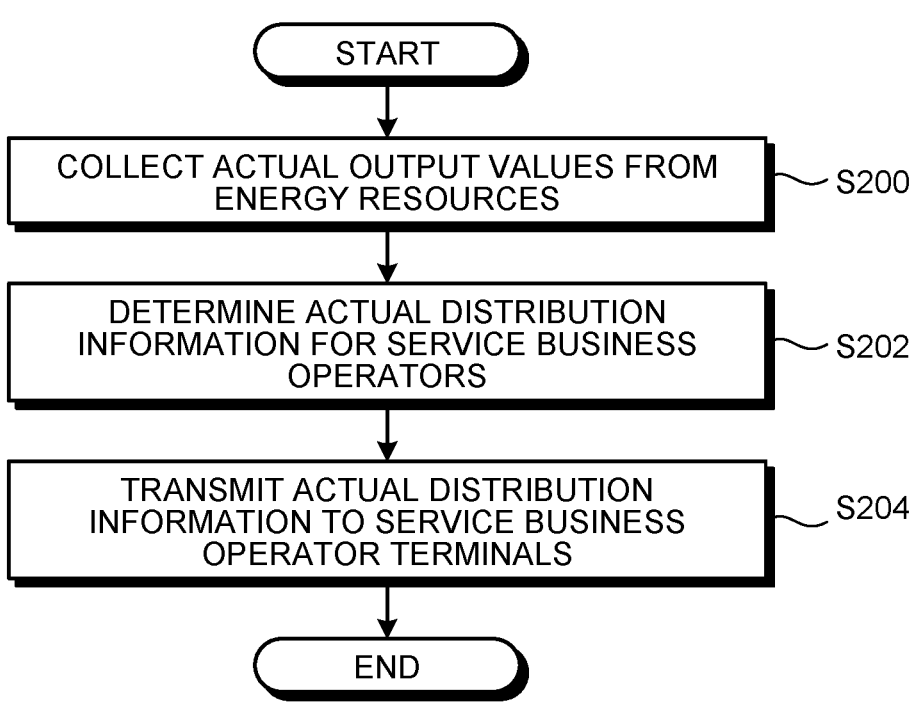
Figure 16:
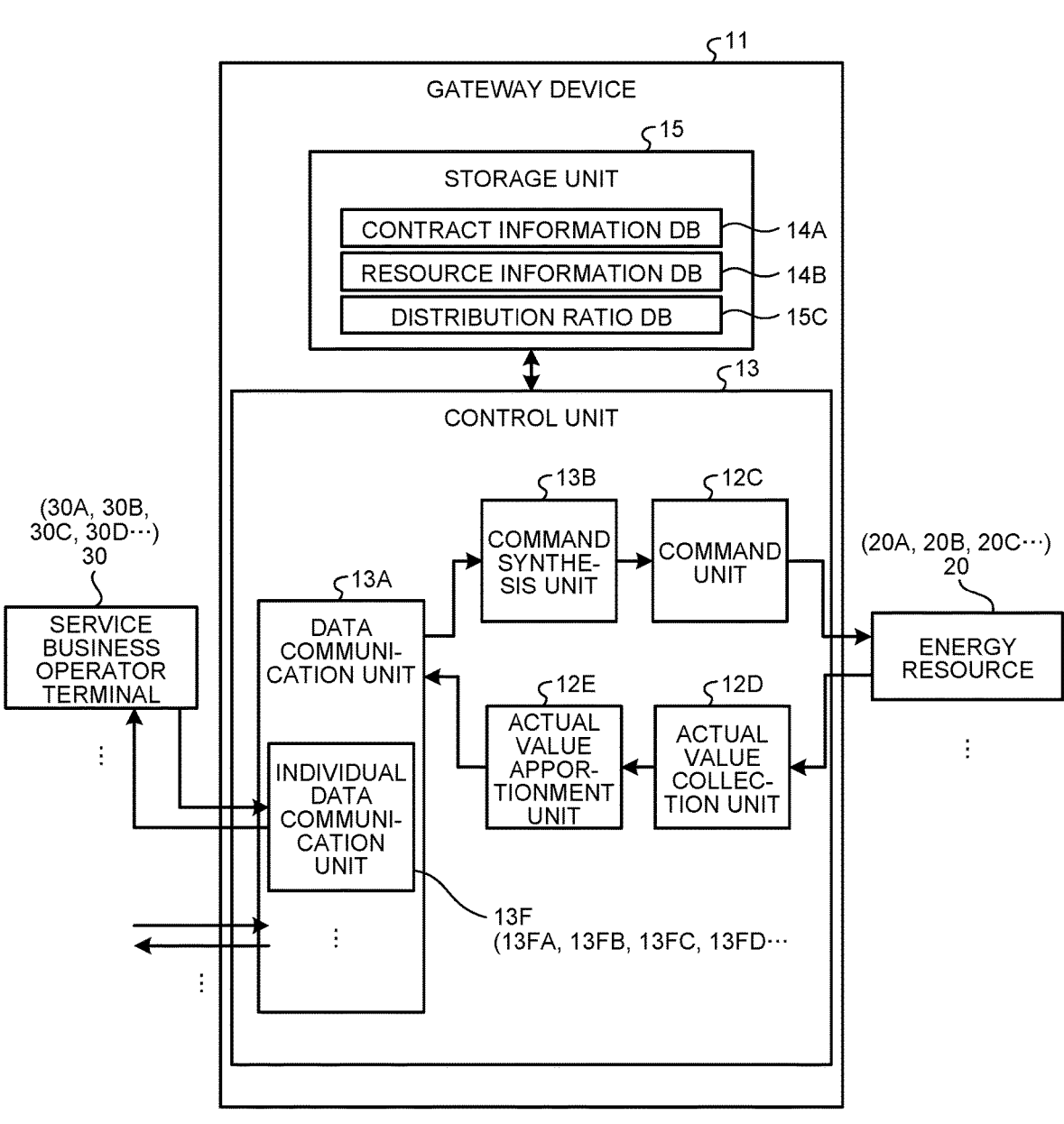
Figure 19:
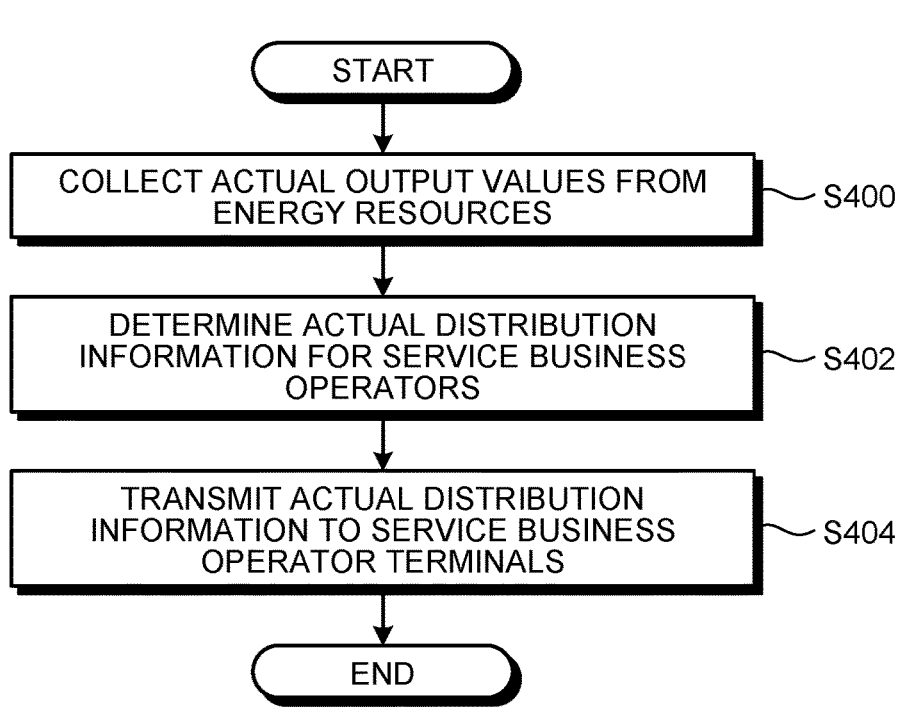
Figure 20:
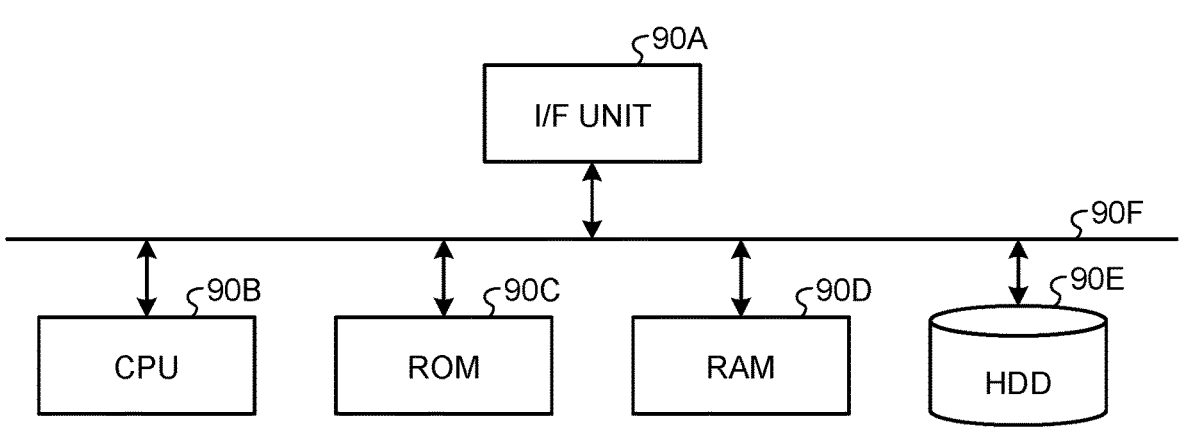

FIG. 4 is a schematic diagram of a data configuration of an resource information DB;
FIG. 5A is an explanatory diagram of synthesis command information generation;
FIG. 5B is an explanatory diagram of synthesis command information generation;
FIG. 5C is an explanatory diagram of synthesis command information generation;
FIG. 6A is an explanatory diagram of synthesis command information generation;
FIG. 6B is an explanatory diagram of synthesis command information generation;
FIG. 6C is an explanatory diagram of synthesis command information generation;
FIG. 7 is a schematic diagram of a data configuration of a distribution ratio DB;
FIG. 8 is a schematic diagram of a data configuration of synthesis command information;
FIG. 9 is a schematic diagram of a data configuration of scheduled provision output information;
FIG. 10 is a schematic diagram of a data configuration of actual output information;
FIG. 11 is a schematic diagram of a data configuration of actual distribution information;
FIG. 12A is an explanatory diagram of distribution in accordance with a scheduled provision distribution ratio;
FIG. 12B is an explanatory diagram of distribution in accordance with the scheduled provision distribution ratio;
FIG. 12C is a diagram of distribution in accordance with priority information;
FIG. 13 is a flowchart illustrating the process of information processing executed by a gateway device;
FIG. 14A is a schematic diagram of a data configuration of command information before synthesis;
FIG. 14B is a schematic diagram of a data configuration of synthesis command information;
FIG. 15 is a flowchart illustrating the process of information processing executed by the gateway device;
FIG. 16 is a schematic diagram of the gateway system;
FIG. 17 is a schematic diagram of a data configuration of the distribution ratio DB;
FIG. 18 is a flowchart illustrating the process of information processing executed by the gateway device;
FIG. 19 is a flowchart illustrating the process of information processing executed by the gateway device; and
FIG. 20 is a hardware configuration diagram.

DETAILED DESCRIPTION

A gateway device according to one embodiment includes one or more hardware processors. The one or more hardware processors are configured to function as a data communication unit, a command synthesis unit, and a command unit. The data communication unit serves to receive, from service business operators, pieces of command information each including a desired output value. The command synthesis unit serves to synthesize the pieces of command information and generate synthesis command information indicating instructed output values for each time slot. The command unit serves to transmit the synthesis command information to an energy resource.

The following describes a gateway device, a gateway program, and a gateway system of the present embodiments in detail with the accompanying drawings.

In the following description of the embodiments, parts denoted by the same reference sign have the same function in effect, and description of any overlapping part is omitted as appropriate.

First Embodiment

Figure 1:
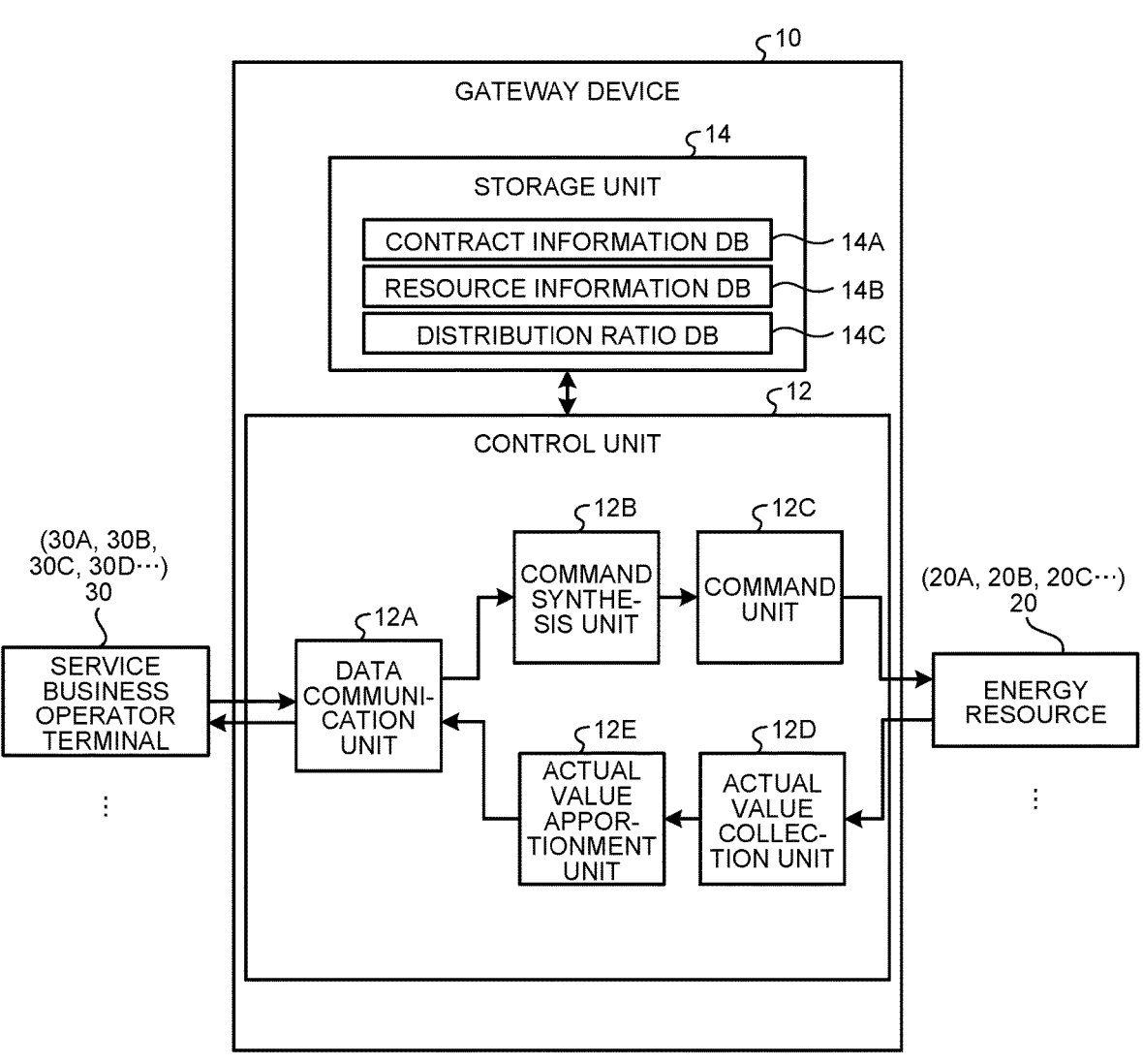
FIG. 1 is a schematic diagram of a gateway system.

FIG. 1 is a schematic diagram of an exemplary gateway system 1 of the present embodiment.

The gateway system 1 is a system configured to perform integrated control of a plurality of energy resources 20 as a balancing group.

The gateway system 1 includes a gateway device 10, one or more energy resources 20, and service business operator terminals 30. Each of the service business operator terminals 30 and the gateway device 10 are communicatively connected to each other via a network or the like. Each of the energy resources 20 and the gateway device 10 are communicatively connected to each other via a network or the like. The energy resources 20 and the service business operator terminals 30 are connected to each other to be able to provide outputs via an electric power system. In the present embodiment, an output from each energy resource 20 to the electric power system is also referred to as provided electric power.

The gateway device 10 is an information processing device configured to mediate or relay between the service business operator terminals 30 and the one or more energy resources 20. The gateway device 10 is managed by a gateway business operator. The gateway business operator is a business operator that performs possession, maintenance, operation, and the like of the gateway device 10. Examples of the gateway device 10 include a gateway server and a gateway computer.

Each energy resource 20 is an energy resource. The term "resource" described in the present disclosure refers to devices, equipment, and facilities, each being used for creating energy, storing energy, and/or saving energy. The energy resource 20 is an energy resource capable of changing the output provided to the electric power system by, for example, increase and decrease of a power consumption amount, electrical charging, and electrical discharging. The energy resource 20 has a function with which the output such as electric power provided to the electric power system can be remotely set via a network or the like.

Examples of the energy resources 20 are various resources including low-voltage resources such as a storage battery, a solar panel, a fuel battery, an electric vehicle (EV), an illumination, an air conditioner, and a water heater, and high-voltage resources such as a thermal power plant, a nuclear power plant, and a renewable energy power plant.

Each energy resource 20 is managed by an resource owner. The resource owner is a person who owns the energy resource 20 and has a right by which the person can freely use the energy resource 20. The resource owner is, for example, a consumer who owns the energy resource 20 or a power plant owner.

In the present embodiment, the gateway system 1 includes more than one energy resources 20. For example, the gateway system 1 includes an energy resource 20A, an energy resource 20B, and an energy resource 20C. The gateway system 1 is not limited to have a configuration including the three energy resources 20A to 20C as long as it has a configuration including one or more energy resources 20. When collectively described, those energy resources 20A to 20C are simply referred to as energy resources 20.

Each service business operator terminal 30 is an information processing device configured to transmit command information or the like as a command to each of the energy resources 20. The command information will be described later in detail. Each service business operator terminal 30 is managed by a service business operator.

Each service business operator is a business operator that controls the power generation amount or the like of each energy resource 20 owned by an resource owner having signed a contract to use resources of the energy resource 20, by giving notification of the command information to the energy resource 20 and performs integrated control of the dispersed energy resources 20. The service business operator provides, by the integrated control, services such as control-situation visualization, maintenance, and proxy operation of the energy resources 20.

The service business operators are also referred to as aggregators. The aggregators include a resource aggregator and an aggregation coordinator.

The resource aggregator signs a contract with the resource owner of each energy resource 20 and collectively controls electric power provided from the energy resources 20 to the electric power system. The aggregation coordinator signs contracts with the resource aggregators, further bundles and controls the electric power bundled by the resource aggregators and directly conducts electric power transaction with a general power transmission and distribution business operator and a retailing electricity business operator. The aggregators also include a business operator serving as both kinds of aggregators.

In the present embodiment, the gateway system 1 includes the service business operator terminals 30 managed by service business operators different from one another. For example, the gateway system 1 includes a service business operator terminal 30A managed by a service business operator A, a service business operator terminal 30B managed by a service business operator B, a service business operator terminal 30C managed by a service business operator C, and a service business operator terminal 30D managed by a service business operator D. The gateway system 1 is not limited to have a configuration including the four service business operator terminals 30A to 30D managed by the four service business operators A to D, respectively, as long as it has a configuration including more than one service business operator terminals 30. When collectively described, those service business operator terminals 30A to 30D are simply referred to as service business operator terminals 30.

The following describes the gateway device 10 in detail.

The gateway device 10 includes a control unit 12 and a storage unit 14. The control unit 12 and the storage unit 14 are communicatively connected to each other. The storage unit 14 stores various kinds of information. The storage unit 14 may be mounted on an external information processing device such as a server device communicatively connected to the gateway device 10. At least one of functional components included in the storage unit 14 and the control unit 12 may be mounted on an external information processing device communicatively connected to the gateway device 10 via a network or the like.

The control unit 12 executes information processing in the gateway device 10. The control unit 12 includes a data communication unit 12A, a command synthesis unit 12B, a command unit 12C, an actual value collection unit 12D, and an actual value apportionment unit 12E.

The data communication unit 12A, the command synthesis unit 12B, the command unit 12C, the actual value collection unit 12D, and the actual value apportionment unit 12E are implemented by, for example, one or more hardware processors. For example, each above-described component may be implemented as execution of a computer program by a processor such as a central processing unit (CPU), in other words, software. Each above-described component may be implemented as a processor such as a dedicated IC, in other words, hardware. Each above-described component may be implemented as software and hardware. When more than one processors are used, each processor may implement one of the components or two or more of the components.

The data communication unit 12A performs data communication with each of the service business operator terminals 30. Specifically, the data communication unit 12A receives command information from each of the service business operator terminals 30.

The command information is information indicating a command from a service business operator terminal 30 to an energy resource 20. The command information includes at least a desired output value. Specifically, the command information includes a desired output value and a desired provision time slot of the desired output value.

The desired output value refers to a value of electric power as an output that the service business operator using the service business operator terminal 30 desires the energy resources 20 to provide. In other words, the value of electric power is the value of the output. The desired provision time slot is a time slot in which the output of the desired output value is desired to be provided.

The output refers to electric power discharged or reduced by the energy resources 20 in accordance with the operation state of the energy resource 20, such as electrical discharging, electrical charging, or stopping. Thus, the value of the output may take zero, a positive value, or a negative value, depending on definition of the positive direction of inflow of the electric power.

An actual command for an energy resource 20 is, for example, a command for adjusting power that is bought and sold in a supply-demand adjustment market for adjusting the power balance of supply and demand. For example, a third adjusting power (2) command defines requirements such as the command interval of 30 minutes and the response time of 45 minutes or shorter. The response time indicates an allowable time until the energy resource 20 can provide an output designated by a command since reception of the command. With these defined requirements, first, a general power transmission and distribution business operator presents the necessary amount of adjusting power to a market. Subsequently, the resource owner of the energy resource 20 performs bidding with, as the adjusting power, a maximum output that can be provided by the energy resource 20 in each time slot. When the bidding is agreed, the resource owner of the energy resource 20 receives a command from the general power transmission and distribution business operator at the defined command interval in the agreed time slot and provides an output to the electric power system in the defined response time on the basis of the received command.

FIG. 2 is a schematic diagram of an exemplary data configuration of the command information.

The command information includes a service business operator ID, a desired output value, and a desired provision time slot. The service business operator ID is identification information of a service business operator that manages a service business operator terminal 30 at the transmission source of the command information. The service business operator ID is given by, for example, the gateway device 10. The desired output value included in the command information is the output value of an output that the service business operator desires to provide, the service business operator being identified by the service business operator ID included in the command information. The desired provision time slot included in the command information is information indicating the time slot of provision of an output at the desired output value included in the command information, which is desired by the service business operator identified by the service business operator ID included in the command information.

Description continues with reference to FIG. 1 again. The data communication unit 12A receives command information from each service business operator terminal 30. The data communication unit 12A receives command information, for example, in the form of a web application by inter-system communication from each service business operator terminal 30 connected over the Internet or the like. The service business operator inputs a desired output value and a desired provision time slot by, for example, operating the service business operator terminal 30. The service business operator terminal 30 transmits, to the gateway device 10 via a network such as the Internet or a dedicated line, command information including the desired output value and the desired provision time slot that are input by the operation of the service business operator. In this case, the data communication unit 12A receives the command information from the service business operator terminal 30 over the network.

The data communication unit 12A adds, to the command information received from the service business operator terminal 30, resource information and priority information that are related to any energy resource 20 available to the service business operator using the service business operator terminal 30. The data communication unit 12A then notifies the command synthesis unit 12B of the resource information and the priority information.

Specifically, the data communication unit 12A refers to a contract information DB 14A and an resource information DB 14B that are stored in the storage unit 14, thereby getting resource information and priority information that are related to any energy resource 20 available to the service business operator using the service business operator terminal 30 at the transmission source of the command information.

FIG. 3 is a schematic diagram illustrating an exemplary data configuration of the contract information DB 14A. The contract information DB 14A is a database for managing contract information. The contract information DB 14A may have a data format of a table or the like and is not limited to a database.

Contract information for each contract is registered in the contract information DB 14A.

Contract information is information related to a contract. With a contract, an resource owner guarantees a service business operator a relation for energy output provision. A contract is signed, for example, between the gateway business operator and at least one of a service business operator and an resource owner. In some cases, a contract is directly signed between a service business operator and an resource owner without the gateway business operator. When a contract is signed, the gateway business operator is provided with authority for holding information related to the contents of the contract signed between a service business operator and an resource owner or between a service business operator and the gateway business operator, and resource information related to an energy resource 20 owned by the resource owner. Thus, the contract information of each contract is registered in the contract information DB 14A in the storage unit 14 of the gateway device 10 in advance. The contract information DB 14A is updated as appropriate, for example, when a new contract is signed or when part of a contract is changed.

The contract information includes a service business operator ID, an resource owner ID, and priority information.

The resource owner ID is identification information of an resource owner. The resource owner ID is given by the gateway device 10 so that each service business operator terminal 30 can identify an resource owner who has signed a contract.

The priority information is information indicating a priority predetermined for each contract with a service business operator. The priority represents priority of the contract.

The priority information includes, for example, a contract type, a command priority, and a distribution policy. The contract type is information indicating the type of a contract. FIG. 3 illustrates, as examples, contract types such as bronze, gold, silver, and diamond. The contract type may be any information indicating the type of a contract and is not limited to the example illustrated in FIG. 3. The priority information may be information not including a distribution policy as long as it is information including at least a contract type or including at least a contract type and a command priority.

The command priority is information indicating the priority of the command information. Specifically, the command priority is information indicating the priority of a command notified by the service business operator terminal 30 at the transmission source of the command information. In other words, the command priority is information indicating the priority of a contract signed with the service business operator using the service business operator terminal 30 at the transmission source of the command information or between the service business operator of the service business operator terminal 30 at the transmission source using the command information and an resource owner.

The command priority is allocated for each contract by, for example, the resource owner of an energy resource 20 in accordance with an output scheduled to be provided by the energy resource 20, a provision frequency, a payment price, and the like when the contract is signed among the gateway device 10, the energy resource 20, and each of service business operators or between each of service business operators and the resource owner of an energy resource 20.

Therefore, command information received from the service business operator terminal 30 of a service business operator having signed a contract of a high priority is processed to be more preferentially satisfied than command information received from the service business operator terminal 30 of a service business operator having signed a contract of a low priority.

FIG. 3 illustrates, as an example, a form in which the command priority is expressed in numbers. For example, the command priority having a smaller number means a higher priority. Alternatively, the command priority having a larger number may express a higher priority.

The command priority may be any information with which a priority can be specified, and is not limited to the form of expression in numbers. For example, the command priority may be information expressed in names such as bronze, silver, gold, and platinum. As illustrated in FIG. 3, when expressed in a name indicating a priority, the contract type may be used as the command priority.

In the present embodiment, the command priority is expressed in numbers, and the form in which a smaller number indicates a higher priority will be described below as an example.

The distribution policy refers to information indicating a priority at synthesis of commands to service business operators. Specifically, the distribution policy is information indicating items prioritized at synthesis of commands to service business operators. The distribution policy includes, as items, for example, command-priority prioritization that the command priority is prioritized, and prior-reception prioritization that the command information previously received is prioritized. The distribution policy may be a policy universal for all time slots or may be a policy limited to a predetermined specific time. When limited to a specific time, the policy may be such that, for example, "the prior-reception prioritization is applied after one hour before a command target time".

Similarly to the command priority, the distribution policy and the contract type are allocated for each contract by, for example, the resource owner of an energy resource 20 in accordance with an output scheduled to be provided by the energy resource 20, a provision frequency, a payment price, and the like when a contract is signed.

The priority information may be changeable as appropriate after a contract is signed. The priority information may be deleted from the contract information DB 14A as appropriate, for example, when the contract period of the corresponding contract expires.

FIG. 4 is a schematic diagram of an exemplary data configuration of the resource information DB 14B. The resource information DB 14B is a database for managing the resource information of each energy resource 20. The data configuration of the resource information DB 14B may be a table or the like and is not limited to a database.

The resource information of each energy resource 20 is registered in the resource information DB 14B. Specifically, for example, the resource information DB 14B is a database in which an resource owner ID, an resource ID, and an resource information are associated.

The resource ID is identification information of the energy resource 20. The resource ID is given by the gateway device 10 to identify the energy resource 20.

The resource information is information related to the energy resource 20. The resource information includes, for example, an resource type, a minimum output, and a maximum output.

The resource type is information indicating classification of the energy resource 20 specified by the corresponding resource ID. The minimum output is information indicating a minimum output that the energy resource 20 can output. The maximum output is information indicating a maximum output that the energy resource 20 can output. In FIG. 4, the minimum output and the maximum output are written as positive in the direction of inflow of electric power from the energy resource 20 to the electric power system, and negative in the direction of inflow of electric power from the electric power system to the energy resource 20. Specifically, when electric power is discharged by electrical discharging or power generation at the energy resource 20, electric power flows from the energy resource 20 into the electric power system. In this case, the output has a positive value. When electric power is consumed by electrical charging and electric power use at the energy resource 20, electric power flows from the electric power system into the energy resource 20. In this case, the output has a negative value.

Description continues with reference to FIG. 1 again. The data communication unit 12A specifies, in the contract information DB 14A, the resource owner ID and the priority information corresponding to the service business operator ID included in the command information received from a service business operator terminal 30. The data communication unit 12A also specifies, in the resource information DB 14B, the resource ID and the resource information corresponding to the specified resource owner ID. Then, the data communication unit 12A adds the specified resource owner ID, the specified resource ID, and the specified resource information to the command information received from the service business operator terminal 30, and notifies the command synthesis unit 12B of the command information.

The command synthesis unit 12B generates synthesis command information by synthesizing pieces of the command information.

The synthesis command information is information obtained by synthesizing pieces of the command information and is information indicating an instructed output value for each time slot. The instructed output value is information indicating the amount of an output instructed to each energy resource 20.

The command synthesis unit 12B generates the synthesis command information by synthesizing the command information received from each of the service business operator terminals 30 by the data communication unit 12A at a distribution ratio based on the priority information predetermined for each contract with a service business operator.

Specifically, the command synthesis unit 12B generates, for each overlapping time slot among the desired provision time slots included in the pieces of command information, the synthesis command information by synthesizing output values in accordance with the desired output values at the distribution ratio based on the priority information. In other words, the command synthesis unit 12B generates the synthesis command information by synthesizing the command information at the distribution ratio based on the priority information for each overlapping time slot in which provision desired times expressed by the pieces of command information overlap among service business operators.

Specifically, the command synthesis unit 12B generates, for each overlapping time slot among the desired provision time slots included in the pieces of command information, the synthesis command information in which the command information having a higher command priority is prioritized, the command priority being included in the priority information.

FIGS. 5A to 5C are explanatory diagrams of exemplary synthesis command information generation.

For example, it is assumed here that an output that can be provided from the energy resource 20A in each time slot is an output provision possible amount 40 illustrated in FIG. 5A. It is also assumed that the command information including an overlapping time slot in which provision desired times overlap is received from each of the service business operator terminal 30A of the service business operator A and the service business operator terminal 30B of the service business operator B. It is also assumed that the command priority of a contract with the service business operator A is higher than the command priority of a contract with the service business operator B.

In this case, the command synthesis unit 12B allocates, to each time slot, a desired output value 42A of the corresponding desired provision time slot included in the command information received from the service business operator terminal 30A of the service business operator A having a higher command priority. For example, it is assumed that the command information includes, as the desired output value 42A, a desired output value 42A2 for the desired provision time slot "13:30" and a desired output value 42A3 for the desired provision time slot "14:00". In this case, as illustrated in FIG. 5A, the command synthesis unit 12B allocates the desired output value 42A2 of the service business operator A to the time slot "13:30" and allocates the desired output value 42A3 of the service business operator A to the time slot "14:00".

Subsequently, the command synthesis unit 12B allocates, to an unallocated output in each time slot, a desired output value 42B of the corresponding desired provision time slot included in the command information received from the service business operator terminal 30B of the service business operator B having a lower command priority.

For example, it is assumed that the command information of the service business operator B includes, as the desired output value 42B, a desired output value 42B1 for the desired provision time slot "13:00" and a desired output value 42B2 for the desired provision time slot "13:30".

In this case, as illustrated in FIG. 5B, the command synthesis unit 12B allocates the desired output value 42B1 of the service business operator B to the time slot "13:00". The time slot "13:30" is an overlapping time slot in which the desired provision time slot of the service business operator A and the desired provision time slot of the service business operator B overlap. Thus, the desired output value 42A2 of the service business operator A having a higher command priority is allocated first to the time slot "13:30".

It is assumed that an unallocated output obtained by subtracting the desired output value 42A2 already allocated to the service business operator A from the output provision possible amount 40 of the energy resource 20A in the time slot "13:30" is equal to or larger than the desired output value 42B2 of the service business operator B for the time slot "13:30". In this case, the command synthesis unit 12B allocates the desired output value 42B2 of the service business operator B for the time slot "13:30" to the time slot "13:30".

It is assumed that the unallocated electric power is smaller than the desired output value 42B2 of the service business operator B for the time slot "13:30". In this case, the command synthesis unit 12B allocates a desired output value 42B2a as the unallocated output in the desired output value 42B2 of the service business operator B for the time slot "13:30" to the time slot "13:30". Allocation is abandoned for a remaining desired output value 42B2b not allocated to the time slot "13:30" in the desired output value 42B2 of the service business operator B for the time slot "13:30".

As illustrated in FIG. 5C, the command synthesis unit 12B does not necessarily need to allocate the desired output value 42B2 of the service business operator B for the time slot "13:30" when the unallocated output is smaller than the desired output value 42B2 of the service business operator B for the time slot "13:30".

In this manner, the command synthesis unit 12B allocates the desired output values included in pieces of the command information for each time slot in accordance with the desired output values and the desired provision time slots included in the command information and the command priority included in the priority information. By the allocation processing in accordance with the command priority, the command synthesis unit 12B generates synthesis command information by synthesizing the pieces of command information at the distribution ratio based on the priority information.

The command synthesis unit 12B may generate, for each overlapping time slot among the desired provision time slots included in the pieces of command information, synthesis command information in which the command information having a higher priority is prioritized, the priority being expressed by an item defined in the distribution policy included in the priority information.

For example, as described above, the command synthesis unit 12B generates, for the pieces of command information, the synthesis command information in which the command information having a higher command priority is prioritized, the command priority being included in the priority information. Then, when command information including a desired provision time slot overlapping the synthesis command information is additionally received after the synthesis command information generation, the command synthesis unit 12B regenerates, for the overlapping time slot, the synthesis command information in which the command information having a higher priority is prioritized, the priority being expressed by an item defined in the distribution policy.

FIGS. 6A to 6C are explanatory diagrams of exemplary synthesis command information generation.

For example, it is assumed here that an output that can be provided from the energy resource 20A in each time slot is an output provision possible amount 40 illustrated in FIG. 6A. Then, a situation in which command information is received from the service business operator terminal 30C of the service business operator C is assumed.

In this case, the command synthesis unit 12B allocates, to each time slot, a desired output value 42C of the corresponding desired provision time slot included in the command information received from the service business operator terminal 30C of the service business operator C. For example, it is assumed that the command information includes, as the desired output value 42C, a desired output value 42C2 for the desired provision for time slot "13:30" and a desired output value 42C3 for the desired provision for time slot "14:00". In this case, as illustrated in FIG. 6A, the command synthesis unit 12B allocates the desired output value 42C2 of the service business operator C to the time slot "13:30" and allocates the desired output value 42C3 of the service business operator C to the time slot "14:00". By this allocation processing, the command synthesis unit 12B generates synthesis command information.

Then, a situation in which, after the synthesis command information generation, the command information including an overlapping time slot is additionally received from the service business operator terminal 30D of the service business operator D having a higher command priority than the service business operator C is assumed.

In this case, the command synthesis unit 12B regenerates synthesis command information in which the command information having a higher priority is prioritized, the priority being expressed by an item defined in the distribution policy included in the priority information of the service business operator D having a higher command priority.

For example, it is assumed that the item defined in the distribution policy included in the priority information of the service business operator D is "prior-reception prioritization". In this case, the command synthesis unit 12B prioritizes the command information of the service business operator C, which is previously received. Thus, the command synthesis unit 12B allocates, to an unallocated output of each time slot, each desired output value 42D of the corresponding desired provision time slot included in the command information of the service business operator D, which has a higher command priority but is received later.

For example, it is assumed that the command information of the service business operator D includes, as the desired output value 42D, a desired output value 42D1 for the desired provision for time slot "13:00" and a desired output value 42D2 for the desired provision for time slot "13:30".

In this case, for example, as illustrated in FIG. 6B, the command synthesis unit 12B allocates the desired output value 42D1 of the service business operator D to the time slot "13:00", which is unallocated. The time slot "13:30" is an overlapping time slot in which the desired provision time slot of the service business operator C and the desired provision time slot of the service business operator D overlap. Thus, the desired output value 42C2 of the service business operator C, which is previously received is prioritized for the time slot "13:30" according to the item "prior-reception prioritization" defined in the distribution policy. Thus, the command synthesis unit 12B allocates, to the time slot "13:30", a desired output value 42D2a as an unallocated output for the time slot "13:30" in the desired output value 42D2 of the service business operator D for the time slot "13:30". Allocation is abandoned for a remaining desired output value 42D2b not allocated to the time slot "13:30" in the desired output value 42D2 of the service business operator D for the time slot "13:30".

For example, it is assumed that the item defined in the distribution policy included in the priority information of the service business operator D is "command-priority prioritization". In this case, the command synthesis unit 12B prioritizes the command information of the service business operator D having a higher command priority. Thus, the command synthesis unit 12B prioritizes allocation of each desired output value 42D of the desired provision time slot included in the command information of the service business operator D, which is received later but has a higher command priority, over the command information of the service business operator C, which is previously received.

For example, it is assumed that the command information of the service business operator D includes, as the desired output value 42D, the desired output value 42D1 for the desired provision for time slot "13:00" and the desired output value 42D2 for the desired provision for time slot "13:30".

In this case, for example, as illustrated in FIG. 6C, the command synthesis unit 12B allocates the desired output value 42D1 of the service business operator D to the time slot "13:00", which is unallocated. The time slot "13:30" is an overlapping time slot in which the desired provision time slot of the service business operator C and the desired provision time slot of the service business operator D overlap. The desired output value 42C2 of the service business operator C is allocated first to the time slot. However, since the item defined in the distribution policy is "command-priority prioritization", the command synthesis unit 12B cancels the desired output value 42C2 allocated first to the service business operator C and allocates the desired output value 42D2 of the service business operator D. The command synthesis unit 12B may allocate the desired output value 42D2 of the service business operator D to the time slot "13:30" and allocate, to the time slot "13:30", an output unallocated to the time slot "13:30" in the canceled desired output value 42C2 of the service business operator C.

In this manner, the command synthesis unit 12B may generate, for each overlapping time slot among the desired provision time slots included in the pieces of command information, the synthesis command information in which the command information having a higher priority is prioritized, the priority being expressed by an item defined in the distribution policy included in the priority information.

Description continues with reference to FIG. 1 again. The command synthesis unit 12B further calculates, on the basis of the instructed output value expressed for each time slot by the synthesis command information, a distribution ratio of scheduled provision to the service business operator terminals 30 for each time slot. Then, the calculated scheduled provision distribution ratio is registered to a distribution ratio DB 14C of the storage unit 14.

The scheduled provision distribution ratio indicates the ratio of an output scheduled to be provided to each of service business operators relative to a total output that can be provided by one energy resource 20.

FIG. 7 is a schematic diagram of an exemplary data configuration of the distribution ratio DB 14C. The distribution ratio DB 14C is a database in which a service business operator ID, an resource ID, the desired output value included in the command information of a service business operator identified by the corresponding service business operator ID, the desired provision time slot included in the command information, and the scheduled provision distribution ratio are associated. The data format of the distribution ratio DB 14C may be a table or the like and is not limited to a database.

For example, it is assumed here that the desired provision time slot and the desired output value included in the command information received from the service business operator A having a higher command priority indicate "60 kW between 10:00 and 12:00". In addition, a situation in which the desired provision time slot and the desired output value included in the command information received from the service business operator B having a lower command priority indicate "50 kW between 11:00 and 13:00" is assumed. It is also assumed that an resource owner having contracts with the service business operator A and the service business operator B owns the energy resource 20A, the energy resource 20B, and the energy resource 20C. In addition, it is assumed that outputs that can be provided by the energy resources 20 are 30 kW for the energy resource 20A, 40 kW for the energy resource 20B, and 20 kW for the energy resource 20C in each time slot.

In this case, the time slot from 11:00 to 12:00 is an overlapping time slot in which the desired provision time slots overlap. The sum of the desired output values of the service business operators A and B is larger than the output provision possible amount of the energy resource 20A, the energy resource 20B, and the energy resource 20C.

Therefore, for the overlapping time slot of "11:00 to 12:00", the command synthesis unit 12B sets 30 kW as an instructed output value to be requested to the energy resource 20A, 40 kW as an instructed output value to be requested to the energy resource 20B, and 20 kW as an instructed output value to be requested to the energy resource 20C.

Then, regarding the energy resource 20B, the command synthesis unit 12B determines that 30 kW and 10 kW out of 40 kW as the instructed output value are provided to the service business operator A and the service business operator B, respectively.

In this case, information indicating the time slot of "11:00 to 12:00" requested to each service business operator terminal 30, and information including the instructed output values of "30 kW", "40 kW", and "20 kW" are newly synthesized as the synthesis command information.

The scheduled provision distribution ratio is expressed as the ratio of an output provided to each service business operator relative to the total output provided by each of the energy resource 20A, the energy resource 20B, and the energy resource 20C. Thus, "0.75" as the ratio of 30 kW received from the energy resource 20B by the service business operator A relative to the output of 40 kW provided by the energy resource 20B in the time slot of "11:00 to 12:00" is the scheduled provision distribution ratio of an output received from the energy resource 20B by the service business operator A. The scheduled provision distribution ratio may be set to an optional ratio in accordance with the priority information and the like by the service business operator and the resource owner.

As described above, the command synthesis unit 12B calculates, on the basis of the instructed output value expressed for each time slot by the synthesis command information, the distribution ratio of scheduled provision to the service business operator terminals 30 for each time slot. Then, the calculated scheduled provision distribution ratio is registered to the distribution ratio DB 14C of the storage unit 14.

Description continues with reference to FIG. 1 again. The command synthesis unit 12B notifies the command unit 12C of the synthesis command information generated for each energy resources 20 by performing the above-described processing.

Specifically, the command synthesis unit 12B generates, for each of the energy resources 20, provision plan information including a group of synthesis command information indicating the instructed output value for each of time slots included in a predetermined future duration, and notifies the command unit 12C of the provision plan information. The predetermined future duration is, for example, one day.

FIG. 8 is a schematic diagram of an exemplary data configuration of the synthesis command information. The synthesis command information includes an resource ID, an instructed output value, and a time slot.

Description continues with reference to FIG. 1 again. The command synthesis unit 12B transmits scheduled provision output information to the service business operator terminals 30 via the data communication unit 12A.

FIG. 9 is a schematic diagram of an exemplary data configuration of the scheduled provision output information. The scheduled provision output information includes an resource ID, an resource owner ID, a scheduled provision output value, and a scheduled provision time slot. The scheduled provision time slot is information indicating a time slot in which an output of the scheduled provision output value is scheduled to be provided.

Description continues with reference to FIG. 1 again.

The command unit 12C transmits the synthesis command information to an energy resource 20. Specifically, the command unit 12C transmits the instructed output value and the time slot included in the synthesized command information to an energy resource 20 identified by the resource ID included in the synthesized command information.

A timing at which the command unit 12C transmits the synthesis command information to the energy resource 20 may be an optional timing before the time slot included in the synthesized command information. For example, it is assumed that the command target energy resource 20 is an resource having a command scheduling function. The command scheduling function is a function with which a time slot of command execution can be set in advance. In this case, immediately after having received the synthesis command information from the command synthesis unit 12B, the command unit 12C may transmit the synthesis command information to the corresponding energy resource 20. It is then assumed that the command target energy resource 20 is an resource having no command scheduling function. In this case, the command unit 12C may transmit the synthesis command information received from the command synthesis unit 12B to the energy resource 20 right before the time slot included in the synthesized command information.

The following describes the actual value collection unit 12D.

The actual value collection unit 12D collects an actual output value from each energy resource 20 via a network or the like. The actual output value is the actual value of an output provided from the energy resource 20 to the electric power system. The actual value collection unit 12D collects actual output information including the actual output value from each of the energy resources 20 and notifies the actual value apportionment unit 12E of the collected actual output information.

FIG. 10 is a schematic diagram of an exemplary data configuration of the actual output information. The actual output information includes an resource ID, an actual output value, and an actual value collection time. The actual value collection time is information indicating a time point or a time slot when the value of an actual output provided to the electric power system from an energy resource 20 identified by the corresponding resource ID is collected.

Description continues with reference to FIG. 1 again.

The actual value apportionment unit 12E determines actual distribution information indicating distribution of the actual output values collected from the energy resources 20 to the service business operators.

Each of the energy resources 20 performs electric power control in accordance with the synthesis command information indicating the instructed output value for each time slot, which is indicated by the provision plan information received from the command unit 12C. However, the instructed output value included in the synthesized command information does not necessarily match with the corresponding actual output value due to environment variation, an energy consumption situation, and the like on the day. For this reason, the gateway device 10 needs to constantly collect the actual output values of the energy resources 20 for each time and determine output values that can be actually provided to the service business operators.

Therefore, the actual value apportionment unit 12E determines the actual distribution information indicating distribution of the actual output values collected from the energy resources 20 to the service business operators.

For example, the actual value apportionment unit 12E determines the actual distribution information indicating energy distribution to each of the service business operator terminals 30, on the basis of the scheduled provision distribution ratio indicated in the distribution ratio DB 14C stored in the storage unit 14.

FIG. 11 is a schematic diagram of an exemplary data configuration of the actual distribution information. The actual value apportionment unit 12E determines the actual distribution information for each service business operator. Thus, for example, the actual distribution information is information associated with each service business operator ID. The actual distribution information includes an resource ID, an actual distributed output value, and an actual value collection time.

The resource ID included in the actual distribution information is identification information of an energy resource 20 that provides an output to a service business operator identified by the corresponding service business operator ID. The actual distributed output value is a value of an output to be distributed to the service business operator among actual output values collected from the energy resources 20 at the corresponding actual value collection time.

For example, the actual value apportionment unit 12E determines the actual distributed output value obtained by distributing the actual output values of the energy resources 20 at the scheduled provision distribution ratio indicated in the distribution ratio DB 14C. In other words, the actual value apportionment unit 12E determines the actual distributed output value at which the actual output values are distributed to each service business operator in accordance with a ratio equal to the scheduled provision distribution ratio.

Specifically, the actual value apportionment unit 12E specifies, for each pair of the resource ID of an energy resource 20 and the service business operator ID, the scheduled provision distribution ratio corresponding to the pair in the distribution ratio DB 14C (refer to FIG. 7). Then, the actual value apportionment unit 12E specifies an actual output value in the actual output information (refer to FIG. 10) for each pair, the actual output value being collected from the energy resource 20 at the actual value collection time of the desired provision time slot corresponding to the pair in the distribution ratio DB 14C. In addition, the actual value apportionment unit 12E determines a result of multiplication of the specified actual output value by the specified scheduled provision distribution ratio, as the actual distributed output value for distribution to the service business operator identified by the service business operator ID included in the pair. Specific description will be made below with reference to diagrams.

FIGS. 12A and 12B are explanatory diagrams of exemplary distribution at the scheduled provision distribution ratio.

For example, it is assumed here that the instructed output value for each time slot included in the synthesized command information to the energy resource 20A is an instructed output value 50 illustrated in FIG. 12A. In addition, it is assumed that the actual output value of the energy resource 20A in each time slot is an actual output value 52 illustrated in FIG. 12A.

As illustrated in FIG. 12B, it is assumed that, in the time slot "13:30", an output value 42A for the service business operator A has a scheduled provision distribution ratio of "0.6" relative to the instructed output value 50, and an output value 42B for the service business operator B has a scheduled provision distribution ratio of "0.4".

Moreover, as illustrated in FIG. 12B, it is also assumed that the actual output value of the energy resource 20A in the time slot "13:30" is the actual output value 52, which is smaller than the instructed output value 50.

In this case, the actual value apportionment unit 12E determines, as an actual distributed output value 54A for the service business operator A, an output value corresponding to the scheduled provision distribution ratio of "0.6" relative to the actual output value 52 of the energy resource 20A in the time slot "13:30". The actual value apportionment unit 12E also determines, as an actual distributed output value of the service business operator B, an actual distributed output value 54B that is an output value corresponding to the scheduled provision distribution ratio of "0.4" relative to the actual output value 52 of the energy resource 20A in the time slot "13:30".

In this manner, for example, the actual value apportionment unit 12E determines an actual distributed output value at which the actual output value of an energy resource 20 is distributed to each service business operator at a ratio equal to the scheduled provision distribution ratio.

The actual value apportionment unit 12E may determine an actual distributed output value at which the actual output value is distributed such that distribution to a service business operator at the transmission source of the command information having a higher priority is preferentially satisfied, the priority being expressed by the priority information. In other words, the actual value apportionment unit 12E may determine an actual distributed output value at a distribution ratio different from the scheduled provision distribution ratio indicated in the distribution ratio DB 14C such that the desired output values of service business operators having higher priorities are preferentially satisfied first.

FIG. 12C is an explanatory diagram of exemplary distribution in accordance with the priority information.

For example, it is assumed that the instructed output value for each time slot included in the synthesis command information to the energy resource 20A is the instructed output value 50 illustrated in FIG. 12A. In addition, it is assumed that the actual output value of the energy resource 20A in each time slot is the actual output value 52 illustrated in FIG. 12C.

As illustrated in FIG. 12C, it is assumed that, in the time slot "13:30", the output value 42A for the service business operator A has a scheduled provision distribution ratio of "0.6" relative to the instructed output value 50 and the output value 42B for the service business operator B has a scheduled provision distribution ratio of "0.4".

Moreover, as illustrated in FIG. 12C, it is also assumed that the actual output value of the energy resource 20A in the time slot "13:30" is the actual output value 52, which is smaller than the instructed output value 50.

In addition, it is assumed that the command priority of the service business operator A is higher than the command priority of the service business operator B. Specifically, it is assumed that the command priority included in the priority information corresponding to the service business operator ID of the service business operator A and the resource owner ID of the energy resource 20A in the contract information DB 14A is higher than the command priority included in the priority information corresponding to the service business operator ID of the service business operator B and the resource owner ID of the energy resource 20A (refer to FIG. 3 as well).

In this case, the actual value apportionment unit 12E determines, as an actual distributed output value of the service business operator A for the actual output value 52 of the energy resource 20A in the time slot "13:30", a desired output value 54A of the service business operator A having a higher command priority in the time slot. In addition, the actual value apportionment unit 12E determines, as the actual distributed output value 54B of the service business operator B, the remaining output obtained by subtracting the desired output value 54A of the service business operator A from the actual output value 52 in the desired output value of the service business operator B having a lower command priority in the time slot.

In this manner, the actual value apportionment unit 12E may determine an actual distributed output value at a distribution ratio different from the scheduled provision distribution ratio indicated in the distribution ratio DB 14C such that the desired output values of service business operators having higher priorities are preferentially satisfied first.

Alternatively, the actual value apportionment unit 12E may determine the actual distribution information including the above-described actual distributed output value by using, in place of the actual output value of one energy resource 20 in each time slot, a total output obtained by combining the actual output values of energy resources 20 owned by one resource owner in each time slot.

Description continues with reference to FIG. 1 again. The data communication unit 12A transmits the actual distribution information determined for each of service business operators by the actual value apportionment unit 12E to the service business operator terminal 30 of the service business operator via a network or the like.

The data communication unit 12A may transmit the actual distribution information in a form such as a Web application to the service business operator terminal 30 connected via the Internet. Alternatively, the data communication unit 12A may transmit the actual distribution information in a form such as a Web service through inter-system communication toward the service business operator terminal 30 as a system used by the service business operator.

The service business operator terminal 30 having received the actual distribution information from the gateway device 10 displays the actual distribution information on a display screen of the service business operator terminal 30. Accordingly, the actual distribution information is displayed on the display screen of the service business operator terminal 30. The service business operator operating the service business operator terminal 30 visually recognizes the display screen, thereby checking the actual distributed output value to be provided from an energy resource 20 and the actual value collection time as the time slot of reception of the output provision, which are included in the actual distribution information. Accordingly, the service business operator can easily check the actual distribution information.

The following describes an exemplary process of information processing executed by the gateway device 10 of the present embodiment.

FIG. 13 is a flowchart illustrating the exemplary process of information processing executed by the gateway device 10. FIG. 13 illustrates the exemplary process of information processing until the synthesis command information is transmitted to an energy resource 20.

The data communication unit 12A transmits, to each of the service business operator terminals 30, the service business operator ID and the uniform resource identifier (URI) of the data communication unit 12A to which the command information is to be sent (step S100). The gateway business operator using the gateway device 10 may notify each service business operator of the service business operator ID and the URI of the data communication unit 12A to which the command information is to be sent, by email or using a Web system or the like in advance. Each service business operator may set in advance, to the service business operator terminal 30 managed by the service business operator, the notified URI of the data communication unit 12A as the transmission destination of the command information.

The data communication unit 12A receives the command information from each of the service business operator terminals 30 (step S102). The data communication unit 12A receives the command information transferred from each of the service business operator terminals 30 at an optional timing.

The data communication unit 12A gets the priority information, the resource ID, and the resource information from the storage unit 14 (step S104). Then, the data communication unit 12A adds the priority information, the resource ID, and the resource information to the command information received at step S102, and notifies the command synthesis unit 12B of the command information.

At step S104, the data communication unit 12A gets, from the resource information DB 14B, the resource ID of each energy resource 20 available to the service business operator using the service business operator terminal 30 at the transmission source of each command information received at step S102 and the resource information corresponding to the resource ID. In addition, the data communication unit 12A gets, from the contract information DB 14A, the service business operator ID of the service business operator using the service business operator terminal 30 at the transmission source of each command information received at step S102 and the priority information corresponding to the resource owner ID corresponding to the specified resource ID. Then, the data communication unit 12A adds the resource ID, the resource information, and the priority information to the command information received at step S102 and notifies the command synthesis unit 12B of the command information.

The command synthesis unit 12B generates synthesis command information by synthesizing, for each energy resource 20, the pieces of command information received at step S102 (step S106).

At step S106, the command synthesis unit 12B generates, by using the command information received from the data communication unit 12A at step S104, to which the resource ID, the priority information, and the resource information have been added, the provision plan information including a group of the synthesis command information indicating the instructed output value for each of time slots included in a predetermined future duration such as one day.

FIG. 14A is a schematic diagram illustrating an exemplary data configuration of the command information before synthesis through the processing by the command synthesis unit 12B at step S106. FIG. 14B is a schematic diagram illustrating an exemplary data configuration of the synthesis command information generated through the processing by the command synthesis unit 12B at step S106.

As illustrated in FIG. 14A, the command information before synthesis includes, for example, a service business operator ID, a desired output value, a command priority, and a desired provision time slot. The command information before synthesis may include no command priority as described above with reference to FIG. 2. As illustrated in FIG. 14B, the synthesis command information after synthesis is information including an resource ID, an instructed output value, and a time slot.

Description continues with reference to FIG. 13 again. The command synthesis unit 12B calculates the distribution ratio of scheduled provision to the service business operator terminals 30 for each time slot, on the basis of the instructed output value expressed for each time slot by the synthesis command information generated at step S106 (step S108). Then, the command synthesis unit 12B registers the scheduled provision distribution ratio calculated at step S108 to the distribution ratio DB 14C of the storage unit 14 (step S110).

The command synthesis unit 12B transmits, to the service business operator terminal 30 via the data communication unit 12A, the scheduled provision output information including the scheduled provision output value corresponding to the scheduled provision distribution ratio calculated at step S108 (step S112).

The command unit 12C transmits, to each energy resource 20, the provision plan information including a group of the synthesis command information generated for the energy resource 20 at step S106 and indicating the instructed output value for each of time slots (step S114). Then, the present routine is ended.

The following describes an exemplary process of information processing from actual output-value collection to distribution by the gateway device 10.

FIG. 15 is a flowchart illustrating the exemplary process of information processing executed by the gateway device 10. FIG. 15 illustrates the exemplary process of information processing from actual output-value collection to distribution.

The actual value collection unit 12D collects actual output values from the energy resources 20 via a network or the like (step S200).

The actual value apportionment unit 12E determines, for each service business operator, the actual distribution information indicating distribution of the actual output values collected from the energy resources 20 at step S200 to the service business operator (step S202).

The data communication unit 12A transmits the actual distribution information determined at step S202 to the service business operator terminal 30 of the corresponding service business operator via a network or the like (step S204). Then, the present routine is ended.

As described above, the gateway device 10 of the present embodiment includes the data communication unit 12A, the command synthesis unit 12B, and the command unit 12C. The data communication unit 12A receives command information including the desired output value from each of service business operators. The command synthesis unit 12B synthesizes the pieces of command information and generates synthesis command information indicating an instructed output value for each time slot. The command unit 12C transmits the synthesis command information to the energy resources 20.

In the conventional technologies, the number of commands that can be received by an energy resource 20 has been limited to one for each time slot. However, as data cooperation spreads on a cloud side in the future, commands from the service business operator terminals 30 are potentially given to one energy resource 20 in the same time slot, and conflict among the commands becomes a problem. The resource owner of the energy resource 20 can obtain larger payment by signing contracts with a larger number of aggregators and thus is desirably capable of receiving a large number of commands as possible and performing processing without conflict. The payment is various benefits and provided as, for example, money, electronic points, discount, or preferential treatment.

However, in the conventional technologies, the number of commands that can be received by one energy resource 20 has been limited to one in any time slot from a viewpoint such as easiness of integrated control. Thus, when an output that can be provided by the energy resource 20 has an available capacity for one command received from one service business operator, the output of the available capacity could not be provided to another service business operator. Accordingly, the output that can be provided by the energy resource 20 could not be utilized to maximum with the conventional technologies. In other words, with the conventional technologies, it has been difficult that the energy resource 20 can provide an output to a larger number of service business operators in any time slot.

By contrast, in the gateway device 10 of the present embodiment, the command synthesis unit 12B synthesizes pieces of command information and generates synthesis command information indicating an instructed output value for each time slot. Then, the command unit 12C transmits the synthesis command information to the energy resource 20.

Therefore, the synthesis command information in which the pieces of command information from the service business operator terminals 30 are synthesized for each time slot is transmitted to the energy resource 20. In other words, in the gateway device 10 of the present embodiment, the pieces of command information are synthesized into one new synthesis command information and transmitted to the energy resource 20. Thus, the energy resource 20 can reply to commands from the service business operator terminals 30 in the same time slot. Accordingly, with the gateway device 10 of the present embodiment, one energy resource 20 can provide an output to service business operators in one time slot.

Therefore, with the gateway device 10 of the present embodiment, the energy resources 20 can provide an output to a larger number of service business operators in any time slot.

Second Embodiment

The present embodiment describes a configuration in which priority information is specified by separating reception ports for receiving command information into priority orders. The same component as in the above-described embodiment is denoted by the same reference sign and detailed description thereof is omitted in some cases.

FIG. 16 is a schematic diagram of an exemplary gateway system 2 of the present embodiment.

The gateway system 2 includes a gateway device 11, energy resources 20, and service business operator terminal 30. The gateway system 2 is the same as the gateway system 1 of the above-described embodiment except that the gateway device 11 is provided in place of the gateway device 10.

The gateway device 11 includes a control unit 13 and a storage unit 15. The control unit 13 and the storage unit 15 are communicatively connected to each other.

The storage unit 15 is the same as the storage unit 14 of the above-described embodiment except that a distribution ratio DB 15C is stored in place of the distribution ratio DB 14C. The distribution ratio DB 15C will be described later in detail.

The control unit 13 executes information processing in the gateway device 11. The control unit 13 includes a data communication unit 13A, a command synthesis unit 13B, the command unit 12C, the actual value collection unit 12D, and the actual value apportionment unit 12E. the command unit 12C, the actual value collection unit 12D, and the actual value apportionment unit 12E are the same as in the above-described embodiment.

Similarly to the data communication unit 12A, the data communication unit 13A performs data communication with each of the service business operator terminals 30. Specifically, the data communication unit 13A receives command information from each of the service business operator terminals 30.

In the present embodiment, the data communication unit 13A includes individual data communication units 13F classified into priority orders. Specifically, when one service business operator is determined for one priority allocated to one individual data communication unit 13F, one service business operator terminal 30 performs data communication with the one individual data communication unit 13F in a one-to-one relation. When service business operators are determined to one priority allocated to one individual data communication unit 13F, the service business operator terminals 30 performs data communication with the one individual data communication unit 13F. In the present embodiment, the following describes, as an example, the case in which one service business operator is determined for one priority allocated to one individual data communication unit 13F. In other words, in the present embodiment, the following describes, as an example, the configuration in which each of the individual data communication units 13F performs data communication with a service business operator terminal 30 in a one-to-one relation.

FIG. 16 illustrates, as examples, an individual data communication unit 13FA corresponding to the service business operator terminal 30A, an individual data communication unit 13FB corresponding to the service business operator terminal 30B, an individual data communication unit 13FC corresponding to the service business operator terminal 30C, and an individual data communication unit 13FD corresponding to the service business operator terminal 30D. Note that, as long as the individual data communication units 13F are classified into priority orders, the individual data communication units 13F may be freely adjustable in accordance with the number of priority levels and is not limited to the configuration in which the four individual data communication units 13FA to 13FD are provided.

Each of the individual data communication units 13F is provided with priority information in accordance with a contract with the corresponding service business operator terminal 30 in advance. For example, each of the individual data communication units 13F is provided with a command priority in accordance with a contract in advance.

Each of the service business operator terminals 30 may be notified in advance of transmission destination information indicating an individual data communication unit 13F corresponding to the command priority of a contract with the service business operator terminal 30. The transmission destination information may be, for example, the URI of the individual data communication unit 13F.

In FIG. 16, as an example, the individual data communication units 13F are provided in the control unit 13. However, as long as each of the individual data communication units 13F serves as a reception port for receiving the command information for the corresponding priority of a contract with a service business operator terminal 30, the individual data communication units 13F are not limited to the configuration of being provided in the control unit 13. For example, the individual data communication units 13F may be mounted on, for example, gateway resources or server devices provided outside the gateway device 11. Alternatively, the individual data communication units 13F may be implemented on server devices provided outside the gateway device 11 and may be identified with different URIs provided for separate end points. Alternatively, the individual data communication units 13F may be mounted on the service business operator terminals 30. In this case, for example, the individual data communication units 13F may be mounted as application programming interfaces (APIs) on the service business operator terminals 30.

Each of the individual data communication units 13F receives command information from any service business operator terminal 30 associated with the individual data communication unit 13F. The individual data communication unit 13F notifies the command synthesis unit 13B of the received command information.

Similarly to the command synthesis unit 12B, the command synthesis unit 13B generates synthesis command information synthesizing the received pieces of command information. However, in the present embodiment, the command synthesis unit 13B generates synthesis command information by synthesizing each of the pieces of command information at a distribution ratio based on the priority information given to an individual data communication unit 13F having received the command information.

Specifically, in the above-described embodiment, the data communication unit 12A specifies, in the contract information DB 14A, the priority information corresponding to the service business operator ID included in the command information received from a service business operator terminal 30 and notified the command synthesis unit 12B of the priority information. Then, in the above-described embodiment, the command synthesis unit 12B generates synthesis command information by using the priority information specified in the contract information DB 14A stored in the storage unit 14.

In the present embodiment, each of the individual data communication units 13F is given in advance the priority information in accordance with a contract with each corresponding service business operator terminal 30.

Therefore, the command synthesis unit 13B specifies the priority information corresponding to the command information by determining an individual data communication unit 13F at which the command information is received. Accordingly, in the present embodiment, the command synthesis unit 13B can easily specify the priority information corresponding to the command information without searching the storage unit 15.

For example, it is assumed here that the command priority of the command information received by the individual data communication unit 13FA is highest and the command priorities of the individual data communication unit 13FB, the individual data communication unit 13FC, and the individual data communication unit 13FD are lower in the stated order. In addition, a situation in which the individual data communication units 13FA and 13FB receive the command information from the service business operator terminals 30A and 30B, respectively, is assumed. In this case, the command synthesis unit 13B determines an individual data communication unit 13F at which each command information is received, thereby specifying that the command priority of the command information received by the individual data communication unit 13FA is higher than the command priority of the command information received by the individual data communication unit 13FB.

Then, similarly to the command synthesis unit 12B of the above-described embodiment, the command synthesis unit 13B may synthesize the pieces of command information by using the specified command priorities and generate synthesis command information.

In the present embodiment, no priority information may be included in the contract information DB 14A stored in the storage unit 15. Alternatively, similarly to the above-described embodiment, priority information may be included in the contract information DB 14A stored in the storage unit 15 (refer to FIG. 3).

Similarly to the command synthesis unit 12B of the above-described embodiment, the command synthesis unit 13B calculates, on the basis of the instructed output value for each time slot expressed by the synthesis command information, the distribution ratio of scheduled provision to each service business operator terminals 30 for each time slot. Then, the calculated scheduled provision distribution ratio is registered to the distribution ratio DB 15C of the storage unit 14.

FIG. 17 is a schematic diagram of an exemplary data configuration of the distribution ratio DB 15C. The distribution ratio DB 15C is a database in which a service business operator ID, an individual data communication unit URI, an resource ID, the desired output value included in the command information of a service business operator identified by the corresponding service business operator ID, the desired provision time slot included in the command information, and the scheduled provision distribution ratio are associated. The data format of the distribution ratio DB 15C may be a table or the like and is not limited to a database.

Specifically, the distribution ratio DB 15C has a data configuration including the individual data communication unit URI in addition to the distribution ratio DB 14C registered by the command synthesis unit 12B of the above-described embodiment. The individual data communication unit URI is the URI of an individual data communication unit 13F. In other words, the individual data communication unit URI is the URI of an individual data communication unit 13F in accordance with a priority, which has received command information from a service business operator terminal 30.

In this manner, the gateway device 11 of the present embodiment has the configuration in which an individual reception port for receiving command information is provided for each priority. Therefore, it is possible to obtain an effect of easily specifying priority information in addition to the effects of the above-described embodiment.

The following describes an exemplary process of information processing executed by the gateway device 11 of the present embodiment.

FIG. 18 is a flowchart illustrating the exemplary process of information processing executed by the gateway device 11. FIG. 18 illustrates the exemplary process of information processing until the synthesis command information is transmitted to an energy resource 20.

The data communication unit 13A transmits, to each of the service business operator terminals 30, the URI of an individual data communication unit 13F corresponding to the command priority of a contract with the service business operator using the service business operator terminal 30, and the service business operator ID thereof (step S300). The gateway business operator using the gateway device 11 may notify each service business operator of the service business operator ID and the URI of an individual data communication unit 13F to which the command information is to be sent, by email or by using a Web system or the like in advance. Each service business operator may set in advance, to the service business operator terminal 30 managed by the service business operator, the notified URI of the individual data communication unit 13F as the transmission destination of the command information.

The individual data communication units 13F each receive the command information from any corresponding service business operator terminal 30 (step S302). The individual data communication units 13F each receives the command information transferred from the corresponding service business operator terminal 30 at an optional timing.

The command synthesis unit 13B determines an individual data communication unit 13F at which the command information is received, thereby specifying the command priority corresponding to the command information. In addition, the command synthesis unit 13B gets, for each command information, the resource ID and the resource information from the storage unit 15 (step S304).

Then, similarly to steps S106 to S114 (refer to FIG. 13) by the gateway device 10 of the above-described embodiment, the gateway device 11 executes the processing at steps S306 to S314.

Specifically, the command synthesis unit 13B generates synthesis command information by synthesizing the pieces of command information received at step S302 for each energy resource 20 (step S306). Then, the command synthesis unit 13B calculates, on the basis of the instructed output value for each time slot expressed by the synthesis command information generated at step S306, the distribution ratio of scheduled provision to the service business operator terminals 30 for each time slot (step S308). Then, the command synthesis unit 13B registers the scheduled provision distribution ratio calculated at step S308, together with the individual data communication unit URI, to the distribution ratio DB 15C of the storage unit 15 (step S310).

The command synthesis unit 13B transmits, via each of the individual data communication units 13F to the corresponding service business operator terminals 30, the scheduled provision output information including the scheduled provision output value corresponding to the scheduled provision distribution ratio calculated at step S308 (step S312).

The command unit 12C transmits, to each energy resource 20, the provision plan information including a group of the synthesis command information generated for the energy resource 20 at step S306 and indicating the instructed output value for each of time slots (step S314). Then, the present routine is ended.

The following describes an exemplary process of information processing from actual output-value collection to distribution by the gateway device 11.

FIG. 19 is a flowchart illustrating the exemplary process of information processing executed by the gateway device 11. FIG. 19 illustrates the exemplary process of information processing from actual output-value collection to distribution.

The actual value collection unit 12D collects actual output values from the energy resources 20 via a network or the like (step S400).

The actual value apportionment unit 12E determines, for each service business operator, the actual distribution information indicating distribution of the actual output values collected from the energy resources 20 at step S400 to the service business operator (step S402). The actual value apportionment unit 12E may determine the actual distribution information by using the distribution ratio DB 15C.

The individual data communication units 13F included in the data communication unit 13A transmit the actual distribution information determined at step S402 to the service business operator terminal 30 of the corresponding service business operator via a network or the like (step S404). Then, the present routine is ended.

As described above, in the gateway device 11 of the present embodiment, the data communication unit 13A includes the individual data communication units 13F corresponding to each of the service business operators and are given the priority information of the service business operators in advance. The command synthesis unit 13B generates synthesis command information by synthesizing each of the pieces of command information at a distribution ratio based on the priority information given to an individual data communication unit 13F having received the command information.

In this manner, the gateway device 11 of the present embodiment has a configuration in which an individual reception port for receiving command information is provided for each priority. Therefore, the gateway device 11 of the present embodiment can obtain an effect of easily specifying the priority information in addition to the effects of the above-described embodiment.

The following describes exemplary hardware configurations of the gateway devices 10 and 11 of the above-described embodiments.

FIG. 20 is an exemplary hardware configuration diagram of the gateway devices 10 and 11 of the above-described embodiments.

The gateway devices 10 and 11 of the above-described embodiments each include a control device such as a central processing unit (CPU) 90B, storage devices such as a read only memory (ROM) 90C, a random access memory (RAM) 90D, and a hard disk drive (HDD) 90E, an I/F unit 90A as an interface for various resources, and a bus 90F connecting the components, and this configuration is a hardware configuration of a normal computer.

In the gateway devices 10 and 11 of the above-described embodiments, each above-described component is implemented on the computer as the CPU 90B reads a computer program from the ROM 90C onto the RAM 90D and executes the computer program.

A computer program for executing each above-described processing executed by the gateway devices 10 and 11 of the above-described embodiments may be stored in the HDD 90E. The computer program for executing each above-described processing executed by the gateway device 10 of the above-described embodiments may be incorporated in the ROM 90C in advance and provided.

The computer program for executing each above-described processing executed by the gateway devices 10 and 11 of the above-described embodiments may be stored as a file of an installable or executable format in a computer-readable storage medium such as a CD-ROM, a CD-R, a memory card, a digital versatile disc (DVD), or a flexible disk (FD) and provided as a computer program product. The computer program for executing each above-described processing executed by the gateway devices 10 and 11 of the above-described embodiments may be stored on a computer connected to a network such as the Internet and provided by downloading over the network. The computer program for executing each above-described processing executed by the gateway devices 10 and 11 of the above-described embodiments may be provided or distributed via a network such as the Internet.

Embodiments of the present disclosure are described above, but these above-described embodiments are presented as examples and not intended to limit the range of the disclosure. The novel embodiments may be performed in other various forms and provided with various kinds of omission, replacement, and change without departing from the scope of the disclosure. These embodiments and their modifications are included in the range and scope of the disclosure and also included in the range of the disclosure written in the claims and its equivalents.

For example, the above-described embodiments are described with, as an example, the form in which a target of command with command information is an energy resource 20. However, the gateway systems 1 and 2 of the present embodiments may be extended to other targets having similar properties.

For example, the gateway systems 1 and 2 of the above-described embodiments may be extended to, for example, a system having a home energy management system (HEMS) cloud or the like as a command target in place of an energy resource 20.

In the above-described embodiments, a service business operator is described as a resource aggregator representing resource owners. However, a service business operator may be an aggregation coordinator representing resource aggregators, and an resource owner may be a resource aggregator representing resource owners.

In the above-described embodiments, description is made with an assumption that operation of energy resources 20 is controlled on the basis of a command from a resource aggregator as in VPP and DR. However, the gateway systems 1 and 2 of the above-described embodiments are not limited to VPP nor DR but may be extended to an energy remote operation service or the like.

For example, the gateway systems 1 and 2 of the above-described embodiments may be extended to, for example, a service that a command is sent to an energy resource 20 from a portable terminal brought with a user when going out and the operation state of the energy resource 20 such as electrical charging or electrical discharging can be remotely operated, and a service that a service business operator takes care of the operation of a household energy resource 20 to achieve energy saving of the energy resource 20.

In the above-described embodiments, description is made with an assumption that electric power is controlled. However, the gateway systems 1 and 2 of the above-described embodiments are not limited to the field of electric power but command targets may be extended to resources in other fields of gas, water, traffic, information communication, and the like. For example, the gateway systems 1 and 2 of the above-described embodiments may be extended to gateway devices and systems for performing control and the like of the use amounts of gas and water, the traffic amounts of moving objects such as an automobile and a drone, the amount of data communication in accordance with the contents of a contract with a customer.

The gateway devices 10 and 11 of the above-described embodiments may be implemented in, for example, an on-premise environment in which a general-purpose computer device is used basic hardware. The gateway devices 10 and 11 of the above-described embodiments may be implemented, for example, as a processor mounted on the above-described computer device executes a computer program configured to implement each functional block. In this case, the gateway devices 10 and 11 of the above-described embodiments may be implemented by installing the above-described computer program on the computer device in advance or may be implemented by distributing the above-described computer program through storage in a storage medium such as a CD-ROM or via a network and installing the computer program on the computer device as appropriate. The gateway devices 10 and 11 of the above-described embodiments may be implemented by using a storage medium, such as a memory, a hard disk, a CD-R, a CD-RW, a DVD-RAM, or a DVD-R, built in or externally connected to the above-described computer device as appropriate.

The gateway devices 10 and 11 of the above-described embodiments may be implemented in a cloud environment in which a cloud service is used. For example, the gateway devices 10 and 11 of the above-described embodiments may be implemented by establishing the gateway devices 10 and 11 on the cloud server and causing a processor of the cloud server to execute a computer program configured to implement each functional block.

The gateway devices 10 and 11 of the above-described embodiments may be implemented in a hybrid cloud environment as a combination of the above-described on-premise environment and cloud environment. For example, the resource information DBs 14A and 14B holding highly confidential information are established in the on-premise environment by using databases in a server owned in a particular company, and any other function is established in the cloud environment. In this manner, the on-premise environment and the cloud environment are separately used depending on usage, which can minimize cost of preparing a physical infrastructure such as a server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gateway device comprising:
   one or more hardware processors configured to:
   receive, from service business operators, pieces of command information each including a desired output value;
   synthesize the pieces of command information and generate synthesis command information with respect to an energy resource that provides electric power to an electric power system and that is capable of changing an output of the electric power to be provided, the synthesis command information indicating instructed output values for each time slot; and
   transmit the synthesis command information to the energy resource, wherein
   the one or more hardware processors generate the synthesis command information by synthesizing the pieces of command information at a distribution ratio, the distribution ratio being based on priority information predetermined for each of contracts with the service business operators,
   the command information includes the desired output value and a desired provision time slot of the desired output value, and
   the one or more hardware processors generate, for each overlapping time slot among the desired provision time slots included in the pieces of command information, the synthesis command information by synthesizing output values in accordance with the desired output values for the time slot at the distribution ratio based on the priority information, and
   wherein generating the synthesis command information for each overlapping time slot includes determining an instructed output value to be provided by the energy resource to two or more service business operators that request provision of electric power from the beginning to the end of each overlapping time slot.

2. The gateway device according to claim 1, wherein the one or more hardware processors generate, for each overlapping time slot among the desired provision time slots included in the pieces of command information, the synthesis command information in which the command information having a higher command priority is prioritized, the command priority being included in the priority information and indicating a priority of the command information.

3. The gateway device according to claim 1, wherein the one or more hardware processors generate, for each overlapping time slot among the desired provision time slots included in the pieces of command information, the synthesis command information in which the command information having a higher priority is prioritized, the priority being expressed by items defined in a distribution policy included in the priority information and indicating a priority at synthesis of a command to the corresponding service business operator.

4. The gateway device according to claim 3, wherein the distribution policy includes, as the items, command-priority prioritization indicating that a command priority indicating a priority of the command information is prioritized, and prior-reception prioritization indicating that the command information previously received is prioritized.

5. The gateway device according to claim 4, wherein
the one or more hardware processors generate, for the pieces of command information, the synthesis command information in which the command information having a higher command priority is prioritized, the command priority being included in the priority information and indicating a priority of the command information, and
when the command information, which includes the desired provision time slot overlapping after generating the synthesis command information, is additionally received, the one or more hardware processors regenerate, for the overlapping time slot, the synthesis command information in which the command information having a higher priority is prioritized, the priority being expressed by the items defined in the distribution policy.

6. The gateway device according to claim 1, wherein
the one or more hardware processors are provided with the priority information of each service business operator in advance, and
the one or more hardware processors generate the synthesis command information by synthesizing the pieces of command information at the distribution ratio based on the priority information provided to one or more hardware processors having received the command information.

7. The gateway device according to claim 1, wherein
the one or more hardware processors generate provision plan information including a group of the synthesis command information indicating the instructed output values for each of time slots included in a predetermined future duration, and
the one or more hardware processors transmit the provision plan information to the energy resource.

8. The gateway device according to claim 1, wherein the one or more hardware processors calculate, on the basis of the instructed output values expressed for each time slot by the synthesis command information, a distribution ratio of scheduled provision to the service business operators for each time slot.

9. The gateway device according to claim 8, wherein the one or more hardware processors are further configured to:
collect an actual output value from the energy resource; and
determine actual distribution information indicating distribution of the actual output value to the service business operators.

10. The gateway device according to claim 9, wherein the one or more hardware processors determine the actual distribution information on the basis of the scheduled provision distribution ratio corresponding to the energy resource.

11. The gateway device according to claim 10, wherein the one or more hardware processors determine the actual distribution information including actual distributed output values obtained by distributing the actual output value at the scheduled provision distribution ratio.

12. The gateway device according to claim 9, wherein the one or more hardware processors determine the actual distribution information including actual distributed output values obtained by distributing the actual output value such that distribution to the service business operators at transmission sources of the command information having higher priorities is preferentially satisfied.

13. The gateway device according to claim 1, wherein the one or more hardware processors are further configured to:
generate the synthesis command information for each energy resource capable of changing an output provided to an electric power system; and
transmit the synthesis command information to a corresponding energy resource.

14. The gateway device according to claim 1, wherein the desired output value is a value of the electric power as an output that each of the service business operators desires the energy resource to provide.

15. The gateway device according to claim 1, wherein the instructed output values are information, each indicating an amount of an output instructed to the energy resource.

16. A computer program product comprising a non-transitory computer-readable recording medium on which a program executable by a computer is recorded, the program instructing the computer to:
receive, from service business operators, pieces of command information each including a desired output value;
synthesize the pieces of command information and generate synthesis command information with respect to an energy resource that provides electric power to an electric power system and that is capable of changing an output of the electric power to be provided, the synthesis command information indicating instructed output values for each time slot; and
transmit the synthesis command information to the energy resource,
wherein
the program instructs the computer to generate the synthesis command information by synthesizing the pieces of command information at a distribution ratio, the distribution ratio being based on priority information predetermined for each of contracts with the service business operators,
the command information includes the desired output value and a desired provision time slot of the desired output value, and
the program instructs the computer to generate, for each overlapping time slot among the desired provision time slots included in the pieces of command information, the synthesis command information by synthesizing output values in accordance with the desired output values for the time slot at the distribution ratio based on the priority information, and
wherein generating the synthesis command information for each overlapping time slot includes determining an instructed output value to be provided by the energy resource to two or more service business operators that request provision of electric power from the beginning to the end of each overlapping time slot.

17. A gateway system comprising:

a gateway device including one or more hardware processors;

service business operator terminals communicatively connected to the gateway device; and an energy resource communicatively connected to the gateway device and the service business operator terminals, the energy resource providing electric power to an electric power system and that is capable of changing an output of the electric power to be provided, wherein the one or more hardware processors of the gateway device are configured to:

receive, from the service business operator terminals, pieces of command information each including a desired output value;

synthesize the pieces of command information and generate synthesis command information with respect to the energy resource, the synthesis command information indicating instructed output values for each time slot; and transmit the synthesis command information to the energy resource, and the one or more hardware processors generate the synthesis command information by synthesizing the pieces of command information at a distribution ratio, the distribution ratio being based on priority information predetermined for each of contracts with the service business operators, the command information includes the desired output value and a desired provision time slot of the desired output value, the one or more hardware processors generate, for each overlapping time slot among the desired provision time slots included in the pieces of command information, the synthesis command information by synthesizing output values in accordance with the desired output values for the time slot at the distribution ratio based on the priority information, and wherein generating the synthesis command information for each overlapping time slot includes determining an instructed output value to be provided by the energy resource to two or more service business operators that request provision of electric power from the beginning to the end of each overlapping time slot.

* * * * *